United States Patent
Wu et al.

(10) Patent No.: US 11,182,904 B2
(45) Date of Patent: Nov. 23, 2021

(54) SYSTEMS AND METHODS FOR IMAGE SEGMENTATION

(71) Applicant: SHANGHAI UNITED IMAGING HEALTHCARE CO., LTD., Shanghai (CN)

(72) Inventors: Yefen Wu, Shanghai (CN); Ke Wu, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 165 days.

(21) Appl. No.: 16/568,466

(22) Filed: Sep. 12, 2019

(65) Prior Publication Data
US 2020/0005463 A1 Jan. 2, 2020

Related U.S. Application Data

(63) Continuation of application No. PCT/CN2017/078265, filed on Mar. 27, 2017.

(51) Int. Cl.
*G06T 7/11* (2017.01)
*G06T 7/162* (2017.01)
(Continued)

(52) U.S. Cl.
CPC ............ *G06T 7/11* (2017.01); *G06K 9/4609* (2013.01); *G06T 7/0012* (2013.01); *G06T 7/13* (2017.01);
(Continued)

(58) Field of Classification Search
CPC . G06T 7/11; G06T 7/162; G06T 7/187; G06T 7/136; G06T 7/168; G06T 7/13;
(Continued)

(56) References Cited

U.S. PATENT DOCUMENTS

| | | | |
|---|---|---|---|
| 2008/0260221 A1* | 10/2008 | Unal | G06T 7/149 382/128 |
| 2009/0129673 A1* | 5/2009 | Simon | G06T 7/11 382/173 |

(Continued)

FOREIGN PATENT DOCUMENTS

| | | |
|---|---|---|
| CN | 104021539 A | 9/2014 |
| CN | 104091331 A | 10/2014 |

(Continued)

OTHER PUBLICATIONS

Xie, Fengyin "Adaptive segmentation based on multi-classification model for dermoscopy images" Front. Comput. Sci 2015 (Year: 2015).*

(Continued)

*Primary Examiner* — Kim Y Vu
*Assistant Examiner* — Molly Delaney
(74) *Attorney, Agent, or Firm* — Metis IP LLC

(57) ABSTRACT

The present disclosure may provide a method for segmenting an image. The method may include obtaining an image and related information. The image may include a tumor region. The method may also include determining a region of interest in the image. The region of interest may include the tumor region. The method may also include performing a first segmentation of the region of interest to obtain a first segmentation result. The first segmentation may include: determining tumor morphology relating to the tumor region; performing a second segmentation of the region of interest to obtain a second segmentation result; and optimizing, based on the tumor morphology, the second segmentation result to obtain the first segmentation result.

20 Claims, 10 Drawing Sheets

(51) Int. Cl.
    *G06T 7/187*     (2017.01)
    *G06T 7/136*     (2017.01)
    *G06T 7/168*     (2017.01)
    *G06T 7/13*     (2017.01)
    *G06T 7/149*     (2017.01)
    *G06T 7/174*     (2017.01)
    *G06T 7/155*     (2017.01)
    *G06K 9/46*     (2006.01)
    *G06T 7/00*     (2017.01)

(52) U.S. Cl.
    CPC .............. *G06T 7/136* (2017.01); *G06T 7/149* (2017.01); *G06T 7/155* (2017.01); *G06T 7/162* (2017.01); *G06T 7/168* (2017.01); *G06T 7/174* (2017.01); *G06T 7/187* (2017.01); *G06T 2207/10081* (2013.01); *G06T 2207/10088* (2013.01); *G06T 2207/10104* (2013.01); *G06T 2207/10124* (2013.01); *G06T 2207/20081* (2013.01); *G06T 2207/30096* (2013.01)

(58) Field of Classification Search
    CPC ......... G06T 7/149; G06T 7/174; G06T 7/155; G06T 7/0012; G06T 2207/10081; G06T 2207/10088; G06T 2207/10104; G06T 2207/10124; G06T 2207/20081; G06T 2207/30096; G06T 2207/20156; G06T 2207/20021; G06T 2207/20104; G06T 2207/20161; G06T 2207/10072; G06T 2207/2001; G06K 9/4609; G06K 9/4604; G06K 9/6212; G06K 2209/05; G06K 9/3233

See application file for complete search history.

(56) References Cited

U.S. PATENT DOCUMENTS

| | | | |
|---|---|---|---|
| 2009/0136103 A1* | 5/2009 | Sonka | G06K 9/6224 382/128 |
| 2012/0134552 A1* | 5/2012 | Boettger | G06T 7/12 382/128 |
| 2012/0230564 A1* | 9/2012 | Liu | A61B 5/7275 382/128 |
| 2018/0012365 A1* | 1/2018 | Chefd'hotel | G06T 7/187 |

FOREIGN PATENT DOCUMENTS

| | | |
|---|---|---|
| CN | 104732509 A | 6/2015 |
| CN | 104766340 A | 7/2015 |
| CN | 106296699 A | 1/2017 |

OTHER PUBLICATIONS

International Search Report in PCT/CN2017/078265 dated Dec. 28, 2017, 7 pages.

Written Opinion in PCT/CN2017/078265 dated Dec. 28, 2017, 8 pages.

* cited by examiner

SYSTEMS AND METHODS FOR IMAGE SEGMENTATION

CROSS-REFERENCE TO RELATED APPLICATIONS

This application is a continuation application of International Application No. PCT/CN2017/078265 filed on Mar. 27, 2017, the entire contents of which are hereby incorporated by reference.

TECHNICAL FIELD

The present disclosure generally relates to systems and methods for image segmentation, and more specifically relates to methods and systems for medical image segmentation.

BACKGROUND

Image segmentation is usually included in the process of image processing and image analysis. With frequent occurrences of tumor, image segmentation has been applied in the study, prevention, diagnosis, and treatment of tumor. Based on the image segmentation, a doctor may evaluate and obtain the information relating to the shape, and size of a tumor, thereby providing effective information for diagnosing lesions and formulating a therapeutic schedule. In actual medical image segmentation, since there is low contrast between the tumor and the surrounding normal tissues, relatively high image noise, blurring tumor edges, and differences in the shapes and sizes of tumors, the tumor segmentation is a relatively difficult problem to solve.

SUMMARY

An aspect of the present disclosure may provide a method for segmenting an image. The method may be implemented on at least one device each of which has at least one processor and at least one storage device. The method may include obtaining an image and related information. The image may include a tumor region. The method may also include determining a region of interest in the image. The region of interest may include the tumor region. The method may also include performing a first segmentation of the region of interest to obtain a first segmentation result. The first segmentation may include: determining tumor morphology relating to the tumor region; performing a second segmentation of the region of interest to obtain a second segmentation result; and optimizing, based on the tumor morphology, the second segmentation result to obtain the first segmentation result.

An aspect of the present disclosure may provide a system. The system may include at least one processor and at least one storage device including a set of instructions. When the instructions executed by the at least one processor, the at least one processor is directed to perform a method for segmenting the image.

In some embodiments, the method may also include performing, based on the first segmentation result, a third segmentation of the region of interest.

In some embodiments, the third segmentation may be based on a level-set algorithm.

In some embodiments, performing the third segmentation based on the level-set algorithm may include: obtaining a distance field function; initializing the distance field function based on the first segmentation result; and performing at least one iteration of the distance field function.

In some embodiments, the image may be a computed tomography image.

In some embodiments, the method may also include: obtaining information relating to the region of interest; and determining the region of interest in the image based on the information relating to the region of interest.

In some embodiments, the determining of the tumor morphology may be based on a straight line passing through the tumor region, a length of a line segment which is an intersection between the straight line and the tumor region being $d_1$.

In some embodiments, the region of interest may be a region encompassed by a cube, a center of the cube being a midpoint of the line segment, a length of a side of the cube being $d_2$, wherein $d_2 = d_1 * r$ and $1 < r < 2$.

In some embodiments, performing the second segmentation may include: collecting a plurality of seeds, the plurality of seeds including at least one positive-sample seed and at least one negative-sample seed; determining a grayscale histogram feature of the plurality of seeds; obtaining a classifier based on the grayscale histogram feature of the plurality of seeds; and performing the second segmentation of the region of interest according to the classifier.

In some embodiments, the at least one positive-sample seed may be in a first region, wherein the first region is a region encompassed by a cube, a center of the cube being a midpoint of the line segment, a length of a side of the cube being $d_3$, wherein $d_3 = d_1 * l$ and $0 < l < 1$.

In some embodiments, the at least one negative-sample seed may be in a second region, wherein the second region is a region encompassed by a cube, a center of the cube being a midpoint of the line segment, a length of a side of the cube being $d_4$, there the cube does not coincide with the region of interest, wherein $d_4 = d_1 * t$ and $1 < t < r$.

In some embodiments, obtaining the classifier based on the grayscale histogram feature of the plurality of seeds may include: normalizing grayscale values of the region of interest in the image; obtaining the grayscale histogram feature of a cube region, wherein each of the plurality of seeds is a center of the cube region, a length of a side of the cube region is R; using the grayscale histogram feature of the cube region for training; and obtaining a classifier based on the training.

In some embodiments, R may be a sum of side lengths of j voxels, and j being an integer greater than one.

In some embodiments, performing the first segmentation of the region of interest may include pre-processing the region of interest.

In some embodiments, pre-processing the region of interest may include down-sampling of the region of interest, enhancing a contrast ratio f the region of interest, or denoising the region of interest.

In some embodiments, determining the tumor morphology may include: determining whether the tumor morphology is a calcified tumor or a lipiodol embolization tumor; obtaining a first determination result based on that the tumor morphology is not the calcified tumor or the lipiodol embolization tumor; determining whether the tumor morphology is a dark tumor based on the first determination result; obtaining a second determination result based on the determination that the tumor morphology is not the dark tumor; determining whether the tumor morphology is a bright tumor based on the second determination result; obtaining a third determination result based on the determination that the tumor morphology is not the bright tumor; and determining that the tumor morphology is a heterogeneity tumor based on the third determination result.

In some embodiments, the tumor morphology may include a calcified tumor, a lipiodol embolization tumor, a dark tumor, a bright tumor, or a heterogeneity tumor.

In some embodiments, optimizing, based on the tumor morphology, the second segmentation result may include: determining that the tumor morphology is the calcified tumor or the lipiodol embolization tumor; obtaining a dark region and a bright region based on the determination that the tumor morphology is the calcified tumor or the lipiodol embolization tumor; and performing a regional growing in the dark region and the bright region.

In some embodiments, optimizing, based on the tumor morphology, the second segmentation result may include: determining that the tumor morphology is the dark tumor; and performing, based on the determining that the tumor morphology is the dark tumor and the second segmentation result, a growing of the region.

In some embodiments, optimizing, based on the tumor morphology, the second segmentation result may include: determining that the tumor morphology is the bright tumor; obtaining a threshold based on the determination that the tumor morphology is the bright tumor; and performing a regional growing based on the threshold.

In some embodiments, optimizing, based on the tumor morphology, the second segmentation result may include: determining that the tumor morphology is the heterogeneity tumor; and based on the determination that the tumor morphology is the heterogeneity tumor, omitting the optimizing the second segmentation result.

An aspect of the present disclosure may provide an image segmentation system. The system may include an I/O module configured to obtain an image and related information. The image may include a tumor region. The system may also include a region of interest determination module configured to determine a region of interest in the image. The region of interest may include the tumor region. The method may also include a coarse segmentation module configured to implement a first segmentation on the region of interest to obtain a first segmentation result. The coarse segmentation module may include a determination unit configured to determine tumor morphology relating to the tumor region; a segmentation unit configured to implement a second segmentation on the region of interest to obtain a second segmentation result; and an optimization unit configured to optimize the second segmentation result based on the tumor morphology to obtain the first segmentation result.

In some embodiments, the system may also include performing a third segmentation of the region of interest based on the first segmentation result.

In some embodiments, the third segmentation may be based on a level-set algorithm.

In some embodiments, performing the third segment based on the level-set algorithm may include: obtaining a distance field function; initializing the distance field function based on the first segmentation result; and performing at least one iteration of the distance field function.

In some embodiments, the image may be a computed tomography image.

In some embodiments, the system may also include: obtaining information relating to the region of interest; and determining the region of interest in the image based on the information relating to the region of interest.

In some embodiments, the determining of the tumor morphology may be based on a straight line passing through the tumor region, a length of a line segment which is an intersection between the straight line and the tumor region being $d_1$.

In some embodiments, the region of interest may be a region encompassed by a cube, a center of the cube being a midpoint of the line segment, a length of a side of the cube being $d_2$, wherein $d_2=d_1*r$ and $1<r<2$.

In some embodiments, performing the second segmentation may include: collecting a plurality of seeds; determining a grayscale histogram feature of the plurality of seeds; obtaining a classifier based on the grayscale histogram feature of the plurality of seeds; and performing the second segmentation of the region of interest according to the classifier. The plurality of seeds may include at least one positive-sample seed and at least one negative-sample seed.

In some embodiments, the at least one positive-sample seed may be in a first region, wherein the first region is a region encompassed by a cube, a center of the cube being a midpoint of the line segment, a length of a side of the cube being $d_3$, wherein $d_3=d_1*l$ and $0<l<1$.

In some embodiments, the at least one negative-sample seed may be in a second region, wherein the second region is a region encompassed by a cube, a center of the cube being a midpoint of the line segment, a length of a side of the cube being $d_4$, where the cube does not coincide with the region of interest, wherein $d_4=d_1*t$ and $1<t<r$.

In some embodiments, obtaining the classifier based on the grayscale histogram feature of the plurality of seeds may include: normalizing grayscale values of the region of interest in the image; obtaining the grayscale histogram feature of a cube region, wherein each of the plurality of seeds is a center of the cube region, a length of a side of the cube region is R; using the grayscale histogram feature of the cube region for training; and obtaining a classifier based on the training.

In some embodiments, R may be a sum of side lengths of j voxels, and j being an integer greater than one.

In some embodiments, performing the first segmentation of the region of interest may include pre-processing the region of interest.

In some embodiments, pre-processing the region of interest may include down-sampling of the region of interest, enhancing a contrast ratio of the region of interest, or denoising the region of interest.

In some embodiments, determining the tumor morphology may include: determining whether the tumor morphology is a calcified tumor or a lipiodol embolization tumor; obtaining a first determination result based on that the tumor morphology is not the calcified tumor or the lipiodol embolization tumor; determining whether the tumor morphology is a dark tumor based on the first determination result; obtaining a second determination result based on the determination that the tumor morphology is not the dark tumor; determining whether the tumor morphology is a bright tumor based on the second determination result; obtaining a third determination result based on the determination that the tumor morphology is not the bright tumor; and determining that the tumor morphology is a heterogeneity tumor based on the third determination result.

In some embodiments, the tumor morphology may include a calcified tumor, a lipiodol embolization tumor, a dark tumor, a bright tumor, or a heterogeneity tumor.

In some embodiments, optimizing, based on the tumor morphology, the second segmentation result may include: determining that the tumor morphology is the calcified tumor or the lipiodol embolization tumor; obtaining a dark region and a bright region based on the determination that the tumor morphology is the calcified tumor or the lipiodol embolization tumor; and performing a regional growing in the dark region and the bright region.

In some embodiments, optimizing, based on the tumor morphology, the second segmentation result may include: determining that the tumor morphology is the dark tumor; and performing, based on the determining that the tumor morphology is the dark tumor and the second segmentation result, a growing of the region.

In some embodiments, optimizing, based on the tumor morphology, the second segmentation result may include: determining that the tumor morphology is the bright tumor; obtaining a threshold based on the determination that the tumor morphology is the bright tumor; and performing a regional growing based on the threshold.

In some embodiments, optimizing, based on the tumor morphology, the second segmentation result may include: determining that the tumor morphology is the heterogeneity tumor; and based on the determination that the tumor morphology is the heterogeneity tumor, omitting the optimizing the second segmentation result.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The drawings herein are described to provide further comprehension of the present disclosure, which belong to part of the present disclosure. The exemplary embodiments and their illustrations are described to explain the present disclosure but not aim to limit the present disclosure. Like reference numbers in the drawings represent like elements.

DETAILED DESCRIPTION

Figure 1A:
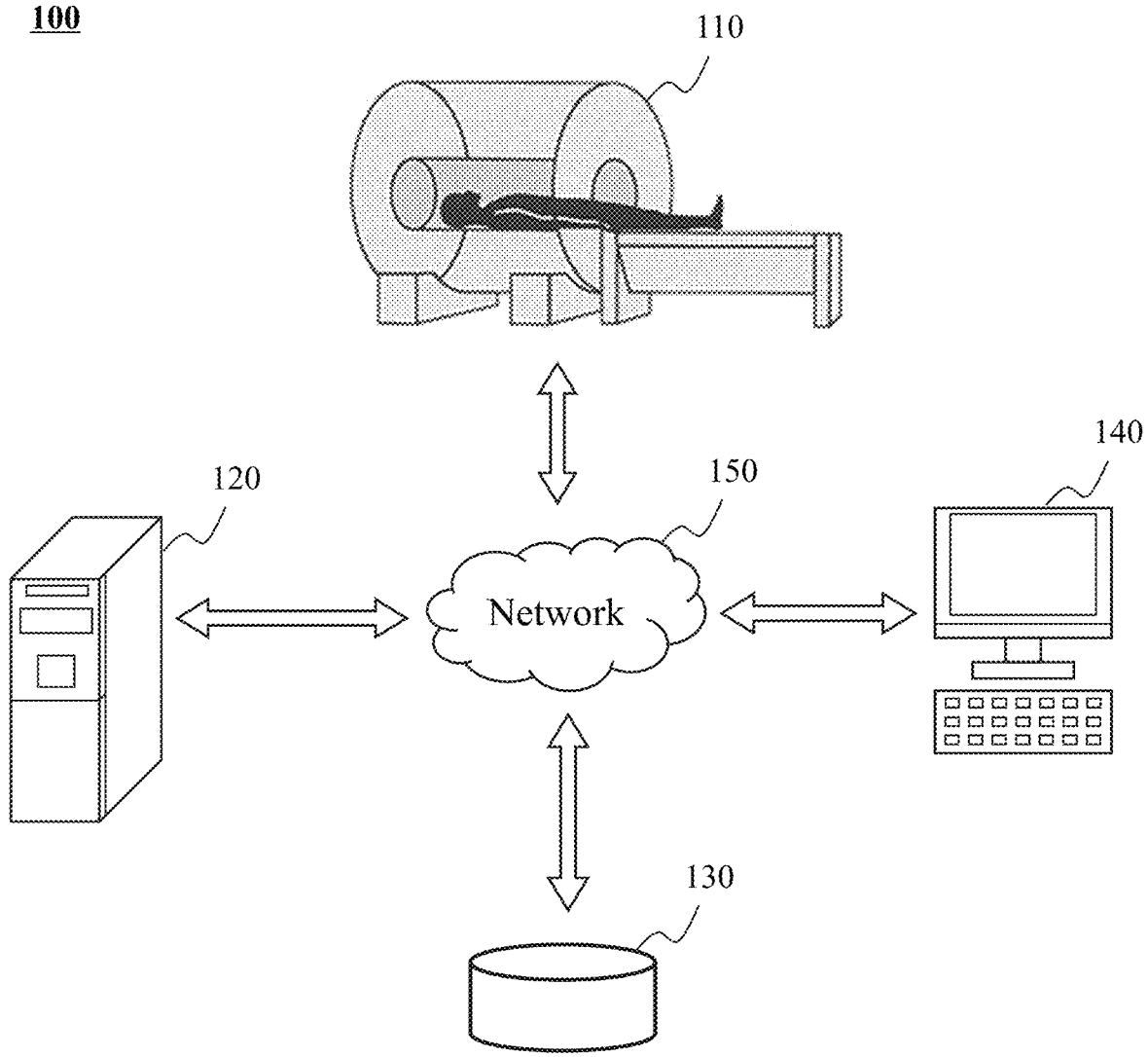
FIG. 1A and FIG. 1B are schematic diagrams illustrating exemplary image processing systems according to some embodiments of the present disclosure.

In the following detailed descriptions, drawings needed in description of embodiments are introduced briefly, which is in order to illustrate technical scheme of the embodiments clearly in the present disclosure. Obviously, the drawings in the following descriptions are only examples or embodiments, for persons having ordinary skill in the art, the present disclosure may be applied to other similar situations according to the drawings without creative labor. Like reference numbers in the drawings represent like structures or operations.

As used in the present disclosure and claims, the singular forms "a," "an," and "the" may not only refer to the singular forms, but also include the plural forms, unless the context clearly indicates otherwise. It will be further understood that the terms "comprise," "comprises," and/or "comprising," "include," "includes," and/or "including," when used in this specification, specify the presence of stated operations and elements, but do not preclude the presence or addition of one or more other operations and elements.

Although some modules in the system are quoted variously according to the embodiments in the present disclosure, any number of different modules may be used and run on the image processing system and/or processors. The module is only illustrative, and different modules may be used in different aspects of the system and method.

The flowcharts used in the present disclosure illustrate operations that the system implemented according to some embodiments in the present disclosure. It is to be expressly understood, the former operation and the latter operation may be not implemented precisely in order. Conversely, the operations may be implemented in inverted order, or simultaneously. Meanwhile, one or more other operations may be added to the flowcharts. One or more operations may be removed from the flowcharts.

In the present application, the object of the image processing may be an image or a portion thereof (e.g., a pixel or voxel of the image). Part of tissue, an organ, or the related content shown in the image may be processed (e.g., to be recognized, segmented, optimized), and the process may be performed based on the corresponding image data thereof. For brevity purposes, these types of processing may be described as the processing of the part of the tissue, organ, or the related content. For example, drawing a straight line on the image corresponding to a tumor may be described as drawing a straight line on the tumor. As another example, segmenting a part corresponding to the tumor or a part corresponding to non-tumor in the image may be respectively described as segmenting a tumor region or a non-tumor region. As another example, optimizing a segmentation result in the image corresponding to the tumor may be described as optimizing the segmentation result in the tumor region. Similarly, a portion corresponding to the tissue, the organ, or the like (e.g., a liver, a lung, or a tumor) in the image may be directly described by the name of the tissue, the organ, or the like. For example, a portion corresponding to the tumor or the non-tumor in the image may be respectively described as a tumor region or a non-tumor region. As another example, a portion corresponding to a region of interest to a user in the image may be abbreviately described as a region of interest.

FIG. 1A illustrates an image processing system 100 according to some embodiments of the present disclosure. The image processing system 100 may include a data acquiring device 110, an image processing device 120, a database 130, an external device 140, and a network 150.

The data acquiring device 110 may be a device for acquiring data. The data may include an image and/or image data. In some embodiments, the data acquiring device 110 may include an imaging device. The imaging device may acquire the image data. The imaging device may be a computed tomography (CT) system, a positron emission tomography (PET) system, a single photon emission computerized tomography (SPECT), a magnetic resonance imaging (MRI) system, a digital radiography (DR) system, or the like, or any combination thereof. In some embodiments, the data acquiring device 110 may send the acquired data to the image processing device 120, the database 130 and/or the external device 140 via the network 150. In some embodiments, the data acquiring device 110 may process the acquired image. The processing may include image preprocessing, image segmentation, image segmentation result optimization, or the like, or any combination thereof.

The image processing device 120 may process the image. The image may be a medical image and/or image data. In some embodiments, the medical image may include a tumor region. In some embodiments, the medical image may include a CT image, an X-ray image, a PET image, an MRI image, an ultrasound image, a cardiogram, an electroencephalogram, or the like, or any combination thereof. In some embodiments, the image data may be a two-dimensional (2D) image or a three-dimensional (3D) image. The form of the image data may include a joint photographic expert group (JPEG), a tagged image file format (TIFF), a graphics interchange format (GIF), a kodak flash pix (FPX), a digital imaging and communications in medicine (DICOM), or the like. The processing may include image preprocessing, image segmentation (for example, coarse segmentation and fine segmentation), optimizing the segmentation result, or the like. In some embodiments, the processing may include segmenting the tumor region in the image (for example, a liver tumor region, a lung tumor region, or the like, or any combination thereof). The processing may be implemented by the image processing device 120 and/or interactive behavior of a user. In some embodiments, the processing implemented by the image processing device 120 may include determining a region of interest, performing coarse segmentation for the region of interest, performing fine segmentation for the region of interest, or the like, or any combination thereof. In some embodiments, the interactive behavior of the user may include drawing a straight line in the image.

In some embodiments, the image processing device 120 may include a processor, one or more storage, or the like, or any combination thereof. In some embodiments, the image processing device 120 may refer to a computer. In some embodiments, the image processing device 120 may process the image data from the database 130. In some embodiments, the image processing device 120 may process the image data acquired by the network 150. In some embodiments, the image processing device 120 may process the image data acquired by the external device 140.

The database 130 may refer to a storage device. The database 130 may store data acquired by the image processing device 120 (e.g., the processed image data by the image processing device 120) and output data by the external device 140 (e.g., the image data and the user interaction behavior that output to the image processing device 120). The database 130 may be local or remote. The database 130 that stores information by way of electric energy may include Random Access Memory (RAM), Read-Only Memory (ROM), flash memory, or the like, or any combination thereof. The database 130 that stores information by way of magnetic energy may include a hard disk, a floppy disk, a magnetic tape, a magnetic core memory, a bubble memory, a USB flash drive, or the like, or any combination thereof. The database 130 that stores information by way of optical energy may include CD (Compact Disk), VCD (Video Compact Disk), or the like, or any combination thereof. The database 130 that stores information by way of virtual storage resources may include cloud storage, a virtual private network, and/or other virtual storage resources. The method for storing information may include sequential storage, link storage, hash storage, index storage, or the like, or any combination thereof.

The external device 140 may output data to the image processing device 120 and/or receive data from the image processing device 120. In some embodiments, the external device 140 may output data to the database 130 and/or receive data from the database 130. In some embodiments, the data input and/or output corresponding to the external device 140 may relate to user interaction. In some embodiments, the external device 140 may include an input/output device. The input device may include a text inputting device (e.g., a keyboard), an optical reading device (e.g., an optical marking reader or an optical text reader), a graphic input device (e.g., a mouse, a joystick, or a light pen), an image inputting device (e.g., a camera, a scanner, or a facsimile device), or the like, or any combination thereof. The output device may include a display device, a printing device, a plotter, a video outputting device, a magnetic recording device, or the like, or any combination thereof. In some embodiments, the external device 140 may play the role of input and output at the same time. For example, a desktop computer, a notebook, a smartphone, a tablet, a personal digital assistant (PDA), etc.

The network 150 may be a signal network and/or a combination network. The network 150 may be and/or include a public network (e.g., the Internet), a private network (e.g., a local area network (LAN), a wide area network (WAN)), etc.), a wired network (e.g., an Ethernet network), a wireless network, a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the image processing system 100 may be connected to the network 150 to exchange data and/or information. In some embodiments, the image processing device 120, the database 130 and the external device 140 may connect to the network 150 by a wired connection, a wireless connection, or a combination thereof.

Figure 1B:
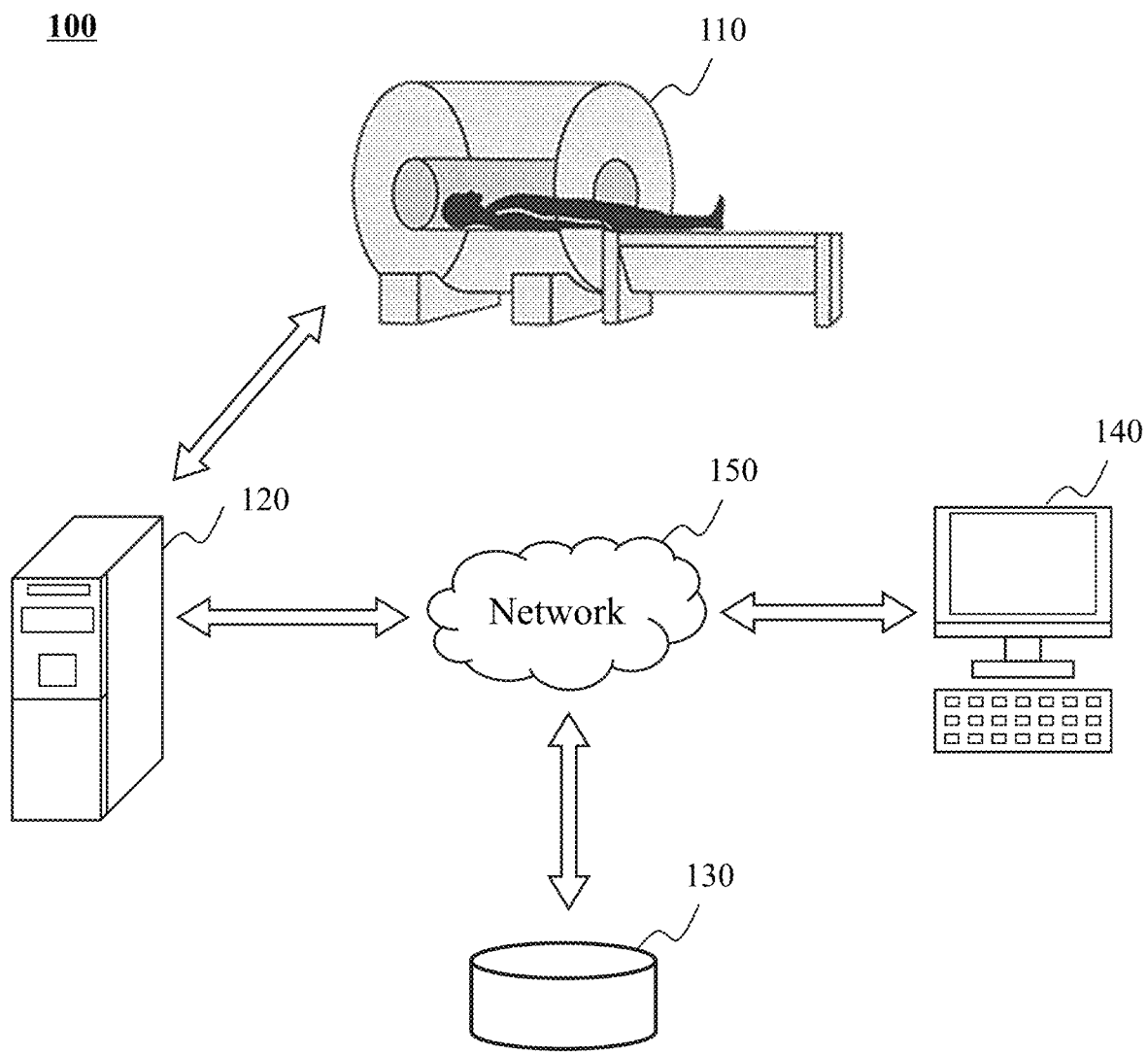

FIG. 1B illustrates another exemplary image processing system 100. FIG. 1B is similar to FIG. 1A. As shown in FIG. 1B, the image processing device 120 may connect with the data acquiring device 110 directly, while the data acquiring device 110 may not connect to the network 150 directly.

It should be noted that the above description of the image processing system 100 may be merely an example, and should not be understood as the only embodiment. To those skilled in the art, after understanding the basic principles of the connection between different units, the units, and connection between the units may be modified or varied without departing from the principles. The modifications and variations may be still within the scope of the current application described above. In some embodiments, these units may be independent, and in some embodiments, part of the units may be integrated into one unit to work together. In some embodiments, the database 130 may be a cloud computing platform with data storage capabilities, which may include a public cloud, a private cloud, a community cloud, a hybrid cloud, or the like, or any combination thereof.

Figure 2A:
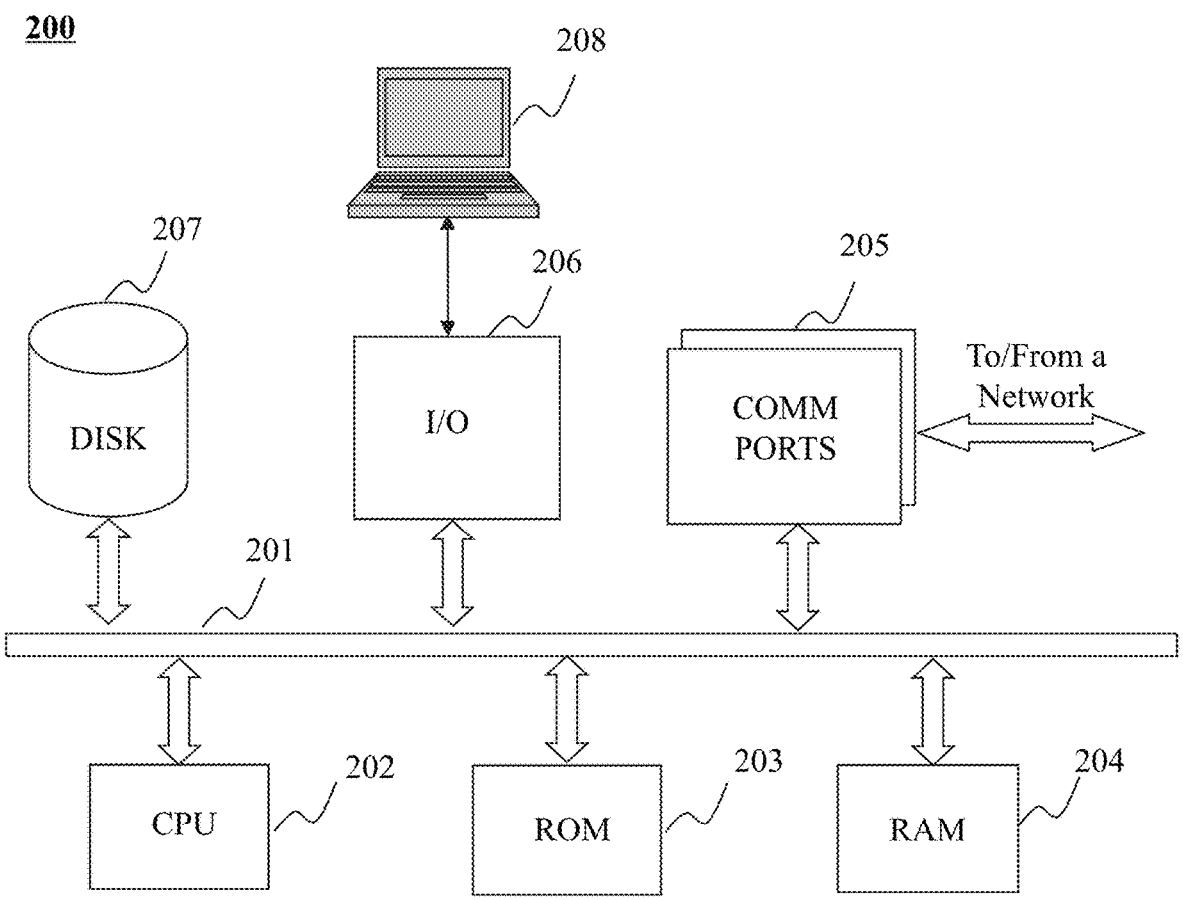
FIG. 2A is a schematic diagram illustrating exemplary components of a computing device according to some embodiments of the present disclosure.

FIG. 2A is a schematic diagram illustrating an exemplary computing device 200 according to some embodiments of the present disclosure. The computing device 200 may be configured to implement the methods and devices described in the present application. The devices described in these embodiments may illustrate a hardware platform that may include a display module in a block diagram. In some embodiments, the computing device 200 may be configured to implement one or more modules or units of the image processing device 120 described in the present application. In some embodiments, the image processing device 120 may be implemented on the computing device 200, via its hardware components, software programs, firmware, or a combination thereof. In some embodiments, the computing device 200 may be a general-purpose computer or a specialized computer.

As shown in FIG. 2A, the computing device 200 may include a communication bus 201, a processor 202, a read-only memory (ROM) 203, or random-access memory (RAM) 204, a communication (COM) ports 205, an I/O component 206, a hard disk 207, and a user interface 208. The communication bus 201 may be configured to facilitate data communications between components in the computing device 200. The processor 202 may determine a region of interest (ROI), perform a coarse segmentation of the ROI, and perform a fine segmentation of the ROI, etc. In some embodiments, the processor may be in the form of one or more processors. The COM ports 205 may facilitate the data communications between the computing device 200 and the components in the image processing system 100 (e.g., the external device 140 and the database 130). In some embodiments, the computing device 200 may transmit data to and receive data from the network 150 via the COM ports 205. The I/O component 206 may support the input/output data stream between the computer device 200 and other components of the image processing system (e.g., the external device 140 and the database 130). The user interface 208 may support the interactions and exchange of data between the computing device 200 and a user. The computing device 200 may further include storage units for storing programs and data, such as, the hard disk 207, and a read-only memory (ROM) 203, or a random-access memory (RAM) 204, which may store the data files in the computing processes and/or data communications as well as the program instructions executable by the processor 202.

Figure 2B:
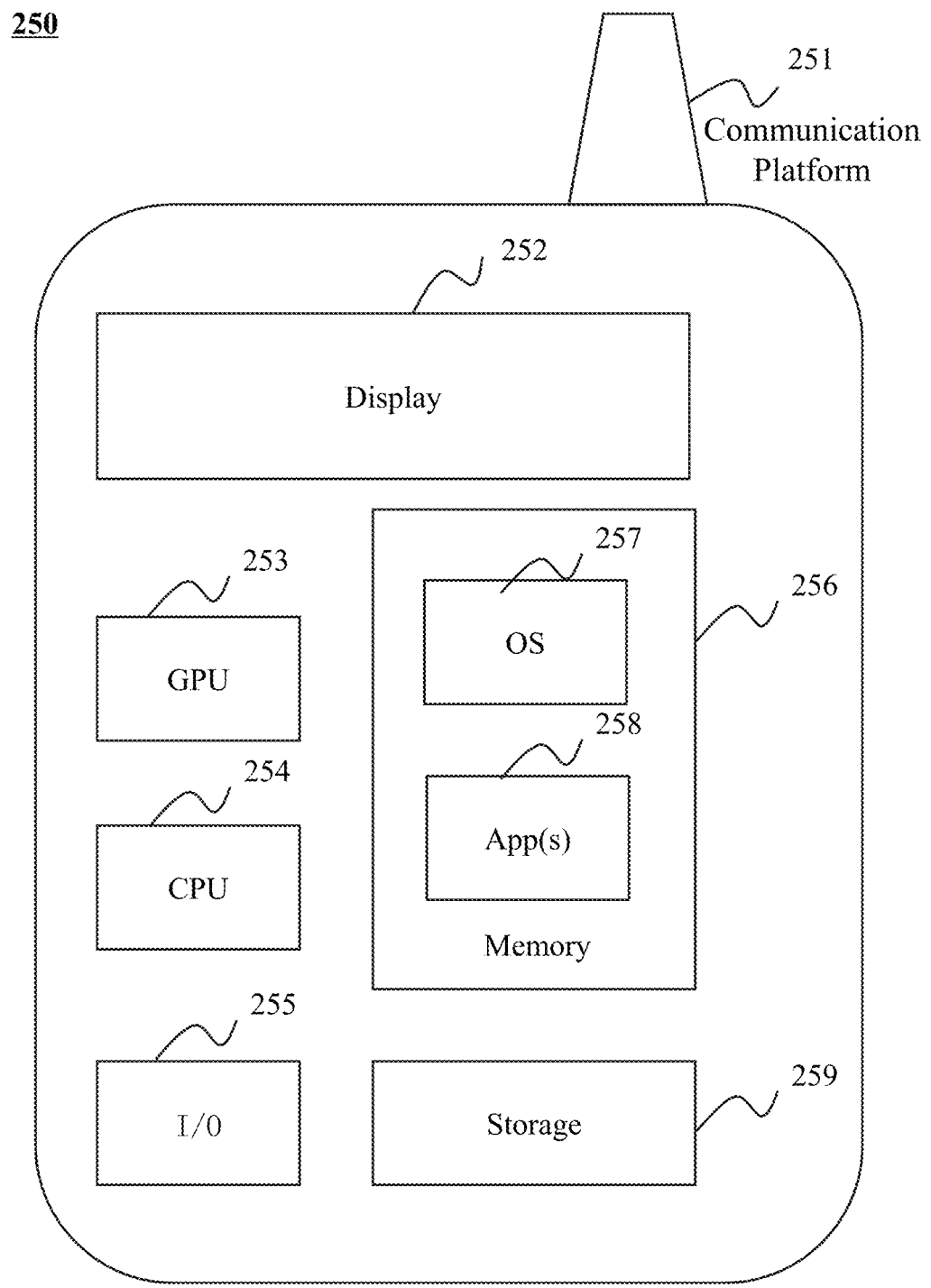
FIG. 2B is a schematic diagram illustrating exemplary components of a mobile device according to some embodiments of the present disclosure.

FIG. 2B is a schematic diagram illustrating an exemplary mobile device 250. The mobile device 250 may be configured to implement certain system described in the present application. In some embodiments, the mobile device 250 may be a user terminal configured to display or exchange related information. The mobile device 250 may include but is not limited to a smartphone, a tablet computer, an audio player, a portable video game consoles, a global positioning system (GPS) receiver, wearable devices (e.g., glass, a watch) or in other forms; please refer to relevant descriptions thereof elsewhere in the present application. The exemplary mobile device 250 may include one or more central processing units (CPUs) 254, one or more graphics processing units (GPUs) 253, a display 252, a memory 256, a communication platform 251 (e.g., a wireless communication unit), a storage 259, and one or more I/O devices 255. Any other proper components, such as system bus or controller (not shown in the figures), may also be included in the mobile device 250.

As shown in FIG. 2B, a mobile operating system 257, for example, iOS™, Android™, Windows Phone™, etc., and one or more applications 258 may be loaded into the memory 256 from the storage 259, which may be executed by the CPU 254. The application(s) 258 may include an application for processing images or other mobile applications that may receive and process images on the mobile device 250. The data relating to the interaction by the user with an image may be received by I/O 255, which may be provided to, via, for example, the network 150, the image processing device 120 and/or other components of the image processing system 100.

To implement various modules, units, and their functionalities described in the present disclosure, computer hardware platforms may be used as the hardware platform(s) (e.g., the image processing device 120 and/or other components in the image processing system 100) for one or more of the elements described above. These computer hardware elements, operation systems, and programming languages are common, and persons having ordinary skill in the art are familiar with those technologies and are able to provide the required information as needed according to the techniques described herein. A computer with user interface elements may be used as a personal computer (PC) or any other type of work stations or terminal devices; it may also be used as a server if appropriately programmed. Persons having ordinary skill in the art are familiar with the structure, program, and general operations of these types of computers; thus no additional explanations are required for the figures herein.

Figure 3:
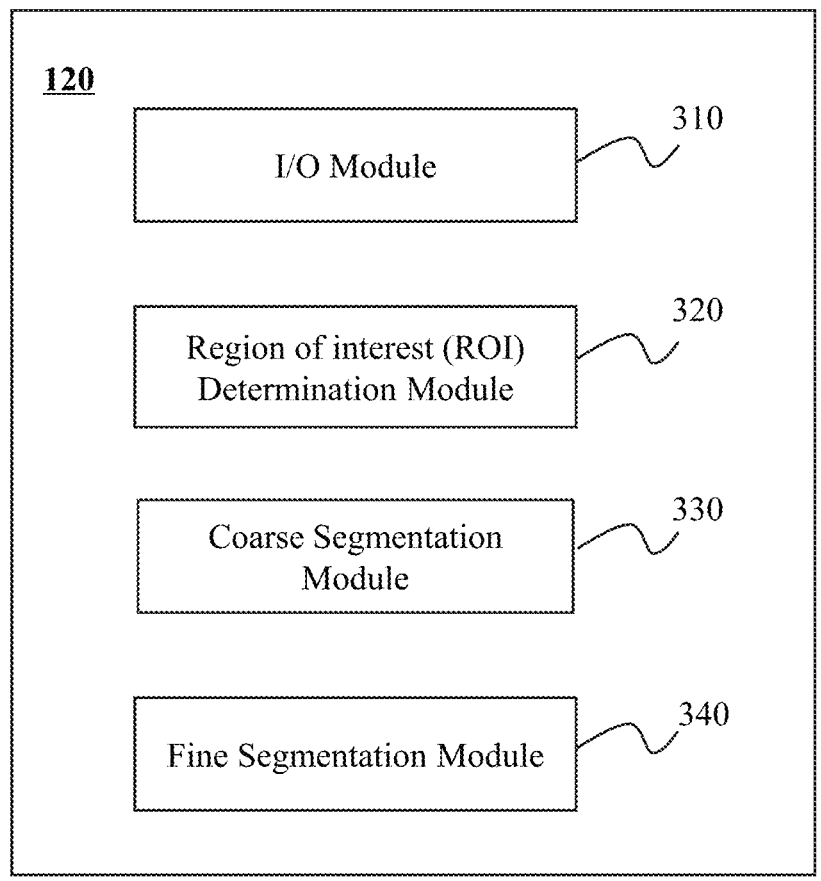
FIG. 3 is a block diagram illustrating an exemplary image processing device according to some embodiments of the present disclosure.

FIG. 3 is a block diagram illustrating an exemplary image processing device according to some embodiments of the present disclosure. The image processing device 120 may include an input/output (I/O) module 310, a region of interest (ROI) determination module 320, a coarse segmentation module 330, and a fine segmentation module 340. It should be noted that the description of the structure of the image processing device 120 is merely exemplary, and is not intended to limit the present disclosure. Each module of the image processing device 120 may be in a wired connection, a wireless connection and/or a combination thereof. Each module of the image processing device 120 may be local, remote and/or a combination thereof. Correspondence relationship among each module of the image processing device 120 may be one-to-one, one-to-many, and/or many-to-many relationship.

The I/O module 310 may input and output an image and related information. The image may be a medical image and/or image data. In some embodiments, the image may be a CT image or CT image data. In some embodiments, the image may be a two-dimensional image or a three-dimensional image. The three-dimensional image may be composed of a plurality of two-dimensional images. In some embodiments, the image may include a tumor region. In some embodiments, the image may be a processed image or image data. The processing may include preprocessing, image segmentation, threshold segmentation, region growing, or the like, or any combination thereof. The related information may include information provided by a user (for example, information provided by a user through an interactive interface), data related to the image (for example, processing historical data), or the like, or any combination thereof. The interactive interface may include the user interface 208 in the computing device 200, the mobile device 250, or the like.

In some embodiments, the image may be marked by the user and/or the coarse segmentation module 330. For example, the user and/or the coarse segmentation module 330 may draw a marked line (for example, a straight line, a curve) in the tumor region in the image. The marked line may be open or closed. The width of the marked line may be one or more pixels/voxels. As another example, when the image is a three-dimensional image composed of a plurality of two-dimensional images, and the plurality of two-dimensional images all have tumor regions, the user and/or the coarse segmentation module 330 may select from the plurality of two-dimensional images a two-dimensional image having the biggest cross-sectional area of a tumor region. Then a marked line may be drawn in the tumor region of the selected two-dimensional image. In some embodiments, the size of the cross-sectional area of the tumor region may be determined by the user based on a subjective judgment (for example, eyes observing) and/or the related tumor region information (for example, an area of the tumor region, a perimeter of the tumor region area, the number or count of the contained voxels). In some embodiments, the coarse segmentation module 330 may determine the size of the cross-sectional area of the tumor region based on the related tumor region information (for example, the area of the tumor region, the perimeter of the tumor region area, the number or count of the contained voxels). For the convenience of explanation, drawing a marked line in the image having a bigger cross-sectional area in the tumor region may be described as drawing a marked line in the tumor region having a bigger cross-sectional area. In some embodiments, the marked line may be a straight line. In some embodiments, the straight line may pass through the tumor region, a line segment may be formed by an intersection between the straight line and the tumor region, and the length of the line segment may be marked as $d_1$. In some embodiments, the related tumor region information may relate to the line segment. In some embodiments, the related tumor region information may be a length of the line segment, a midpoint of the line segment, a voxel value of the line segment, the number or count of the contained voxels of the line segment, or the like, or any combination thereof. The voxel value of the line segment may include a CT value, a grayscale value, brightness, or the like, or any combination thereof. The related tumor region information may include the user interactive information. In some embodiments, the user interactive information (or refer to information provided by the user) may be directly acquired by the user operation. In some embodiments, the user interactive information may be indirectly acquired by the user operation. For example, the line segments information may be acquired based on the marked line.

In some embodiments, the I/O module 310 may receive information from the database 130 and/or the external device 140. In some embodiments, the I/O module 310 may output the received information to the other modules in the image processing device 120 or other parts of the image processing system 100. In some embodiments, information received by the I/O module 310 may be stored in the database 130, analyzed by the image processing device 120, or processed by the image processing device 120. In some embodiments, the ROI determination module 320 may be implemented by the processor 202 in the computing device 200.

In some embodiments, the I/O module 310 may input and output information via the input/output component 206 in the computing device 200. In some embodiments, the computing device 200 may exchange data with the mobile device 250. For example, the input/output component 206 in the computing device 200 and the input/out device 255 in the mobile device 250 may exchange information between the computing device 200 and the mobile device 250. For example, the user may draw a marked line on an image displayed on the mobile device 250; and the mobile device 250 may send the information of the marked line to the computing device 200. The information of the marked line may be used in image processing. For example, the user may draw a marked line in an image displayed on the user interface 208 in the computing device 200; the information of the marked line may be sent by the input/output module 310 to the computing device 200, the information of the marked line may be used in image processing.

The ROI determination module 320 may determine a region of interest in the image. The region of interest may include a tumor region. In some embodiments, the tumor region in an image may be fully included in the region of interest. In some embodiments, the region of interest may be a region encompassed by a cube, a rectangular parallelepiped, a sphere, an irregular polyhedron, etc. In some embodiments, the region of interest may include a square, a rectangle, a circle, an irregular-shaped polygon, etc. In some embodiments, the ROI determination module 320 may determine a region of interest by information provided by a user (for example, information provided by a user through the user interface 208 or the mobile device 250). For example, the user may draw a marked line in the tumor region having a bigger cross-sectional area by the user interface 208, wherein the marked line may pass through the tumor region. The width of the marked line may be one or more pixels/voxels. The marked line may be a straight line. A line segment may be formed by an intersection between the straight line and the tumor region, and the length of the line segment is $d_1$. Related tumor region information may include a length of the line segment, a midpoint of the line segment, voxel values of the line segment, the number or count of voxels contained in the line segment, distribution or change of the voxel values in the line segment, or the like, or any combination thereof. In some embodiments, the ROI determination module 320 may define a region whose center is a point in the line segment as an ROI. The point may be designated by a user, or be determined by the ROI determination module 320. For example, the ROI determination module 320 may define a region encompassed by a cube as a region of interest. A center of the cube may be a midpoint of the line segment and a length of a side of the cube may be $d_2$. In some embodiments, $d_2=d_1*r$, $1<r<2$. In some embodiments, r may be 1.4, 1.5, 1.6, 1.7, 1.8, etc.

In some embodiments, the ROI determination module 320 may obtain information related to the ROI. The information related to the ROI may include a maximum value, a minimum value, the area, the perimeter of the ROI, the number or count of the voxels contained in the ROI, distribution or change of the voxel values in the ROI, or the like, or any combination thereof. The information related to the region of interest may be in the form of a character or graphic, or a combination thereof. For example, the information related to the region of interest may be presented in the form of primitives (for example, a grayscale histogram, a graph, or the like, or any combination thereof). The maximum value and the minimum value of the ROI may be a maximum value and a minimum value of the voxel values in the ROI. The voxel value may include a CT value, a grayscale value, brightness, or the like, or any combination thereof.

The coarse segmentation module 330 may be configured to implement a coarse segmentation in an ROI. The coarse segmentation may segment the tumor region in the image. In some embodiments, the coarse segmentation may sort the voxels in the ROI into tumor voxels and non-tumor voxels. The tumor voxels may be voxels corresponding to a tumor in the image. The non-tumor voxels may be voxels corresponding to a non-tumor in the image. In some embodiments, the coarse segmentation module 330 may determine tumor morphology. The tumor morphology may include a calcified tumor, a lipiodol embolization tumor, a dark tumor, a bright tumor, a heterogeneity tumor, a giant tumor, etc. In some embodiments, the coarse segmentation module 330 may implement preprocessing of the ROI. The preprocessing may include setting the resolution of the ROI, enhancing a contrast ratio (e.g., the maximum brightness or grayscale value to the minimum brightness or grayscale value in the ROI) of the ROI, a denoising operation, or the like, or any combination thereof. In some embodiments, the coarse segmentation module 330 may segment the ROI to obtain a segmentation result. In some embodiments, the coarse segmentation module 330 may optimize the segmentation result to obtain a coarse segmentation result. In some embodiments, the optimization may be performed based on the tumor morphology. In some embodiments, the coarse segmentation module 330 may complete the coarse segmentation of the ROI. The coarse segmentation may be implemented on the processor 202 in the computing device as illustrated in FIG. 2. More descriptions regarding the coarse segmentation may be found elsewhere in the present disclosure. See, e.g., FIG. 5 and the relevant descriptions thereof.

The fine segmentation module 340 may implement a fine segmentation to the ROI. The fine segmentation may refer to image segmentation based on the coarse segmentation result. In some embodiments, the fine segmentation module 340 may segment the image based on a segmentation technique. Exemplary segmentation techniques may include a threshold segmenting technique, an edge detecting technique, a region segmentation technique, a graph partitioning technique, an energy functional technique, a clustering technique, or the like, or any combination thereof. The threshold segmentation technique may include an Otsu's technique, a minimum error technique, a maximum entropy technique, etc. The edge segmentation technique may refer to a differential operator. For example, a Robert operator, a Prewitt operator, a Sobel operator, a Laplacian operator, a Canny operator, etc. The region segmentation technique may include a region growing technique, a regional merge, and split technique and/or a watershed segmentation algorithm. The graph partitioning segmentation technique may include a minimum spanning tree technique, a normalized cut technique, a min-max cut technique and/or a graph cut technique. The energy functional technique may be an active contour model and an algorithm based on the active contour model, for example, a Snake model, a level-set algorithm, etc. The clustering technique may include a blur c-means clustering algorithm, a K-means clustering algorithm, etc. As an example, the fine segmentation module 340 may implement the fine segmentation in the ROI based on a level-set algorithm. The fine segmentation module 340 may set a distance field function. The distance field function may be initialized based on the coarse segmentation result. The distance field function may be further iterated to obtain the fine segmentation result. In some embodiments, the fine segmentation module 340 may complete the fine segmentation of the ROI by the processor 202 in the computing device 200.

It should be noted that the above description of the image processing device 120 may be merely an example, and should not be understood as the only embodiment. To those skilled in the art, after understanding the basic principles of the connection between different units, the units, and connection between the units may be modified or varied without departing from the principles. The modifications and variations may be still within the scope of the current application described above. For example, the image processing device 120 may include a storage module. The storage module may store information generated during the image processing (middle data, the image segmentation result). As another example, the coarse segmentation module 330 and the fine segmentation module 340 may be two different modules or the same module that have functions of the coarse segmentation function and the fine segmentation function. As yet another example, at least a part of functions of the ROI determination module 320 may be implemented by the input/out device 255 and the central processing unit 254 in the mobile device 250. Such modifications may be in the protective scope of the present disclosure.

Figure 4:
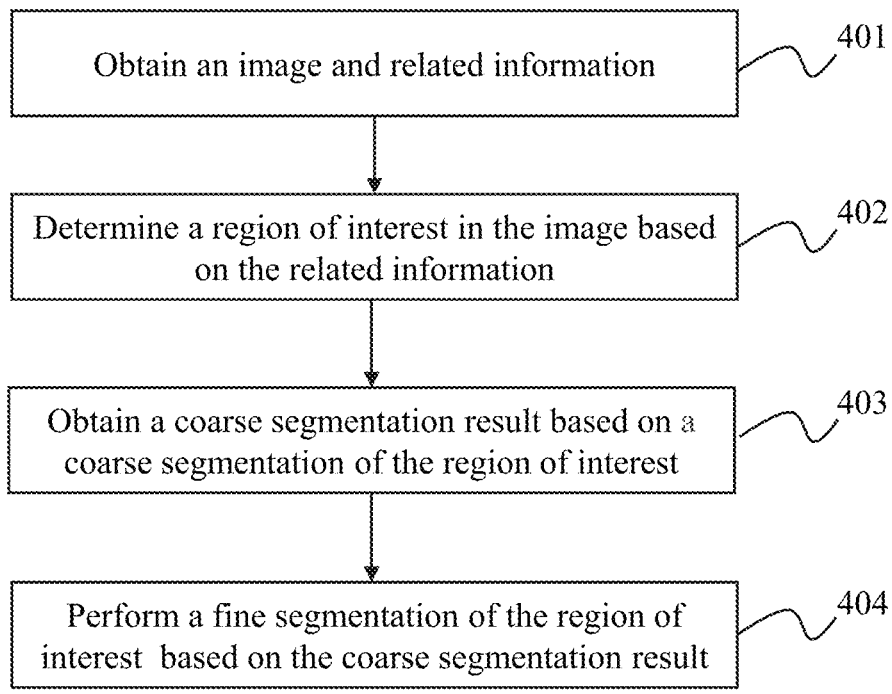
FIG. 4 is a flowchart illustrating an exemplary process for processing an image according to some embodiments of the present disclosure.

FIG. 4 is a flowchart illustrating an exemplary process for processing an image according to some embodiments of the present disclosure. In some embodiments, at least a portion of the process 400 may be implemented on the image processing device 120.

In 401, an image and related information may be obtained. The image may be a medical image or image data. The medical image may be a CT image. In some embodiments, the image may be a three-dimensional image. In some embodiments, the image may include a tumor region. The related information may include tumor-related information, information provided by a user (for example, the information provided by the user through the user interface 208, the mobile device 250), image-related data (for example, historical data of the image processing), or the like, or any combination thereof. In some embodiments, the user and/or the coarse segmentation module 330 may draw a marked line in the tumor region having a bigger cross-sectional area, wherein the marked line may pass through the tumor region. The width of the marked line may be one or more pixels/voxels. The marked line may be a straight line. A line segment may be formed by an intersection between the straight line and the tumor region. Length of the line segment may be marked as $d_1$. In some embodiments, the tumor-related information may be the length, a midpoint, a voxel value of the line segment, the number or count of the voxels contained in the line segment, or the like. The voxel value may include a CT value, a grayscale value, brightness, or the like, or any combination thereof.

In 402, an ROI in the image may be determined according to the related information. The ROI may include the tumor region. In some embodiments, the ROI may include a whole tumor region in the image. In some embodiments, the ROI may be a region encompassed by a cube, a rectangular parallelepiped, a sphere, an irregular polyhedron, etc. For example, the ROI may be a region defined by a square whose center is a point and side length is $d_2$. In some embodiments, the point may be a midpoint of the line segment in the related information obtained in 401. In some embodiments, $d_2=d_1*r$, $1<r<2$. The $d_1$ may be the length of the line segment in the related information obtained in 401. The r may be 1.4, 1.5, 1.6, 1.7, 1.8, etc.

In some embodiments, the process 400 may obtain information related to the ROI in 402. The information related to the ROI may be a maximum value and a minimum value of the voxel values in the ROI. The voxel value may include a CT value, a grayscale value, brightness, or the like, or any combination thereof.

In 403, coarse segmentation in the ROI may be implemented to obtain a coarse segmentation result. The coarse segmentation may be configured to segment the tumor region from the image. In some embodiments, the coarse segmentation may sort the voxels in the ROI into tumor voxels and non-tumor voxels. In some embodiments, the coarse segmentation may include determining tumor morphology, preprocessing the ROI, segmenting the ROI, optimizing the segmentation result, or the like, or any combination thereof. The coarse segmentation result may be an image or image data after the coarse segmentation. More descriptions regarding the coarse segmentation may be found elsewhere in the present disclosure. See, e.g., FIG. 6 and the relevant descriptions thereof.

In some embodiments, the coarse segmentation result may include the tumor voxels and the non-tumor voxels. The coarse segmentation result may be performed according to equation (1) below:

$$\theta_0(x) = \begin{cases} 1, & x \in \text{tumor} \\ 0, & x \in \text{else} \end{cases} \quad (1)$$

where $\theta_0(x)$ represents the coarse segmentation result, and x represents the voxels in the ROI.

In 404, a fine segmentation in the ROI may be implemented based on the coarse segmentation result. The fine segmentation may refer to image segmentation. In some embodiments, the fine segmentation module 340 may segment the image based on a segmentation technique. Exemplary segmentation techniques may include a threshold segmenting technique, an edge detecting technique, a region segmentation technique, a graph partitioning technique, an energy functional technique, a clustering technique, or the like, or any combination thereof. The energy functional technique may be an active contour model and an algorithm based on the active contour model, for example, a Snake model, a level-set algorithm, etc. In some embodiments, the process 400 may implement the fine segmentation in the ROI according to the level-set algorithm.

In some embodiments, the process 400 may initialize a distance field function. The distance field function may refer to a positional relationship of the voxels in the ROI. In some embodiments, the positional relationship may be indicated based on a Euclidean distance. For example, when the Euclidean distance of the voxels in the ROI is greater than a threshold, it may indicate that the voxels may be located in the tumor region. As another example, when the Euclidean distance of the voxels in the ROI is smaller than the threshold, it may indicate that the voxels may be located outside the tumor region (for example, the voxels may be located in the non-tumor region). In some embodiments, the process 400 may initialize the distance field function based on the coarse segmentation result. The initialized distance field function may be defined according to equation (2) below:

$$\varnothing^0(x) = \begin{cases} +L, & \theta_0(x) = 1 \\ -L, & \theta_0(x) = 0 \end{cases}, \quad (2)$$

where $\varnothing^0(x)$ represents the initialized distance field function, L represents the Euclidean distance, and $\theta_0(x)$ represents the coarse segmentation result. In some embodiments, L may be a positive integer (e.g., one, two).

In some embodiments, the process 400 may perform at least one iteration based on the initialized distance field function. In some embodiments, the initialized distance field function may be defined according to equation (3), (4), (5) and (6) below:

$$\phi^{i+1}(x) = \phi^i(x) + \tau\left[\frac{\partial \phi^i(x)}{\partial t}\right], \quad (3)$$

$$\frac{\partial \varnothing(x)}{\partial t} = \mu\zeta(\varnothing(x)) + \xi(g, \varnothing(x)), \quad (4)$$

$$\zeta(\varnothing(x)) = \nabla\phi(x) - div\left(\frac{\nabla\phi(x)}{|\varnothing(x)|}\right), \quad (5)$$

$$\xi(g, \varnothing(x)) = \lambda\delta(\varnothing(x))div\left(g\frac{\nabla\phi(x)}{|\varnothing(x)|}\right) + vg\delta(\varnothing(x)), \quad (6)$$

in which $\delta(\varnothing(x))$ may be defined according to equation (7):

$$\delta(\phi(x)) = \begin{cases} 0, & |\phi(x)| > \varepsilon \\ \frac{1}{2\varepsilon}\left[1 + \cos\left(\frac{\pi\phi(x)}{\varepsilon}\right)\right], & |\phi(x)| \leq \varepsilon \end{cases} \quad (7)$$

where ø represents the distance field function, x represents voxels in the ROI, i represents the number or count of iteration(s) of the distance field function, τ represents the time step length or weight of the evolution, t represents time, μ represents the coefficient or weight of ζ(ø(x)), ζ represents a penalty term, ξ represents an external force term, g represents an image gradient, λ represents an image smooth coefficient, δ represents a Dirac delta function (or δ function), v represents an external force coefficient during an evolution process, and ε represents a constant greater than zero. In some embodiments, μ may be set by a user or the system. In some embodiments, p may constrain τ according to the constraint relationship of τμ<¼. In some embodiments, E may be set by a user or the system. In some embodiments, ε may be a smaller floating-point number (for example, 1.52).

In some embodiments, the process 400 may implement a k-th iterative calculation based on the initialized distance field function. In some embodiments, K may include numbers between 20 to 50. In some embodiments, K may be 20, 30, 40, 50, etc. In some embodiments, K may be greater than 50 or smaller than 20.

In some embodiments, the process 400 may obtain the fine segmentation result based on the iterated distance field function. The fine segmentation result may include tumor voxels and non-tumor voxels. In some embodiments, the fine segmentation may be defined according to equation (8) below:

$$\theta_1(x) = \begin{cases} 1, & \varnothing^K(x) \geq 0 \\ 0, & \varnothing^K(x) < 0 \end{cases}, \qquad (8)$$

where $\theta_1(x)$ represents the fine segmentation result, x represents voxels in the region of interest, and $\varnothing^K$ represents the distance field function after the K-th iterative calculation.

It should be noted that the above descriptions of the process 600 may be merely provided for the purposes of illustration, and not intended to limit the scope of the present disclosure. For persons having ordinary skills in the art, multiple variations and modifications may be made under the teachings of the present disclosure. However, those variations and modifications may not depart from the scope of the present disclosure.

Figure 5:
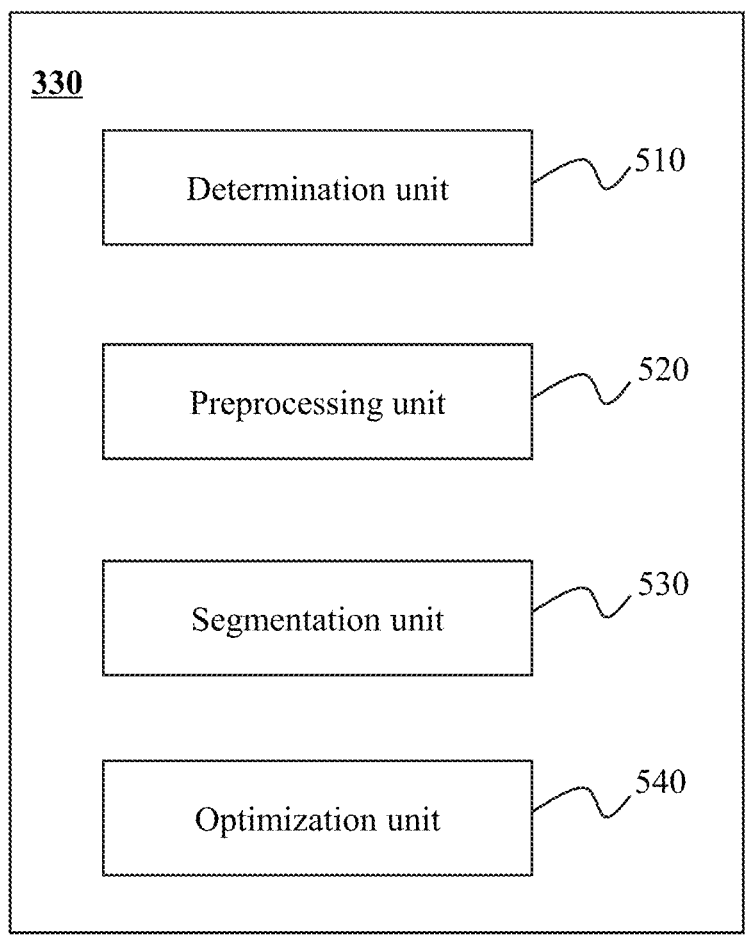
FIG. 5 is a diagram illustrating an exemplary coarse segmentation module according to some embodiments of the present disclosure.

FIG. 5 is a block diagram illustrating an exemplary coarse segmentation module 330 according to some embodiments of the present disclosure. The coarse segmentation module 330 may include a determination unit 510, a preprocessing unit 520, a segmentation unit 530, and an optimization unit 540. In some embodiments, the determination unit 510, the preprocessing unit 520, the segmentation unit 530 and the optimization unit 540 may be implemented on the processor 202 in the computing device 200. It should be noted that the above description of the coarse segmentation module 330 in the image processing device 120 may be merely an example, and should not be understood as the only embodiment. In some embodiments, the coarse segmentation module 330 may also include other units. In some embodiments, some units in the units may not exist. In some embodiments, some units in the coarse segment module 330 may be combined into one unit to work together. In some embodiments, the units may be independent. The independent units may implement respectively. In some embodiments, the units may be interrelated. The interrelated units may implement based on the same data.

The determination unit 510 may determine tumor morphology based on an image. The image may include an image, image data, image information, etc. The tumor morphology may include a calcified tumor, a lipiodol embolization tumor, a dark tumor, a bright tumor, a heterogeneity tumor, a giant tumor, or the like, or any combination thereof. In some embodiments, the determination unit 510 may determine the tumor morphology based on image information. The image information may include information related to the ROI, tumor-related information, or the like, or any combination thereof. The information related to the ROI may be a maximum value and a minimum value of the voxel values of voxels in the ROI. The voxel value may include a CT value, a grayscale value, brightness, or the like, or any combination thereof. In some embodiments, a user and/or the determination unit 510 may draw a marked line in the tumor region having a bigger cross-sectional area. The marked line may pass through the tumor region. The width of the marked line may be one or more pixels/voxels. The marked line may be a straight line. A line segment may be formed by an intersection between the straight line and the tumor region. In some embodiments, the tumor-related information may be a length, a midpoint, a voxel value of the line segment, the number or count of the voxels contained in the line segment, etc.

In some embodiments, the determination unit 510 may determine the tumor morphology. The determination may include a first determination and a second determination. The first determination may refer to a first determining of the tumor morphology. A first tumor morphology may be obtained based on the first determining. The second determination may refer to a second determining of the tumor morphology based on the first tumor morphology. A second tumor morphology may be obtained based on the second determining. In some embodiments, when the first tumor morphology is a dark tumor in the first determining and the second tumor morphology is a giant tumor in the second determining, the determination unit 510 may determine that the tumor morphology may be a giant and dark tumor.

The preprocessing unit 520 may implement a preprocessing of the ROI. The preprocessing may include down-sampling of the ROI, enhancing contrast of the ROI, a denoising operation, or the like, or any combination thereof. In some embodiments, the down-sampling may refer to a resolution normalization of the ROI. The resolution normalization of the ROI may include determining a resolution of the ROI and setting the resolution of the ROI based on the resolution of the ROI. For example, when the resolution of the ROI is greater than or equal to a threshold, the resolution of the ROI may be set as the threshold. As another example, when the resolution of the ROI is smaller than the threshold, the resolution of the ROI may remain unchanged. In some embodiments, the threshold may be a number between 70 to 90. For example, the threshold may be 70, 80, 90. The enhancing the contrast of the ROI may include a histogram equalization technique, a greyscale transformation technique (for example, a linear grayscale transformation, a non-linear grayscale transformation), an image sharpening technique. In some embodiments, the preprocessing unit 520 may enhance the contrast of the ROI based on the histogram equalization. The histogram equalization may refer to an equilibrium re-distribution of an image based on a determination by the greyscale probability distribution. An image of a balanced probability density distribution may be obtained. The denoising operation may include a mean filtering, a median filtering, a multi-image average filtering, a low-pass filtering, a wiener filtering, the least square filtering, or the like, or any combination thereof. In some embodiments, the preprocessing unit 520 may implement the denoising processing based on the mean filtering. The mean filtering may refer to transforming a neighborhood mean of the voxels into the grayscale value corresponding to the voxels in the image.

The segmentation unit 530 may segment the ROI. The segmentation may include a learning classification technique, a segmentation technique based on a threshold, a segmentation technique based on an edge, a segmentation technique based on a region, a segmentation technique based on graph theory, a segmentation technique based on an energy function, a clustering algorithm, or the like, or any combination thereof. The learning classification technique may refer to segmenting the image based on machine learning. In some embodiments, the classification technique based on the machine learning may sort the voxels in the image into first-class voxels (for example, the tumor voxel), second-class voxels (for example, the non-tumor voxel), or the like. In some embodiments, the machine learning may include a supervised learning (for example, linear discriminant analysis, a support vector machine, a decision tree, a naive bayesian), an unsupervised learning (for example, a Kmeans algorithm, a self organization map network, a gaussian mixture model), a regression analysis, or the like, or any combination thereof. The segmentation technique based on threshold may include an Otsu's technique, a minimum error technique, a maximum entropy technique, etc. The segmentation technique based on the edge may be implemented based on a differential operator (for example, a Robert operator, a Prewitt operator, a Sobel operator, a Laplacian operator, a Canny operator). The segmentation technique based on the region may include a region growing, a regional merge and split technique, a watershed segmentation algorithm, etc. The segmentation technique based on the graph theory may include a minimum spanning tree technique, a Normalized Cut technique, a Min-Max Cut technique, a Graph Cut technique, etc. The segmentation technique based on the energy function may be an active contour model and an algorithm based on the active contour model (for example, a Snake model, a level-set algorithm). The clustering algorithm may include a blur c-means clustering algorithm, a K-means clustering algorithm, etc.

In some embodiments, the segmentation unit 530 may segment the ROI by the learning classification technique. The segmentation unit 530 may acquire positive-sample seeds and negative-sample seeds, obtain a classifier based on the positive-sample seeds and the negative-sample seeds, and traverse all voxels in the ROI according to the classifier, thereby segmenting the ROI and obtaining the segmentation result. The positive-sample seeds may be voxels in the tumor region. The negative-sample seeds may be voxels in the non-tumor region. The classifier may be a linear classifier, a piecewise linear classifier, a non-linear classifier, etc.

The optimization unit 540 may optimize the segmentation result. In some embodiments, the segmentation result may be a segmentation result obtained based on the segmented ROI by the segmentation unit 530, or an optimized segmentation result by the optimization unit 540. For example, the segmentation result may be a mask of the segmented ROI. In some embodiments, the optimization unit 540 may mark the mask. For example, the optimization unit 540 may mark the segmented tumor region or the non-tumor region in the mask of the ROI. In some embodiments, the optimization unit 540 may implement optimization based on an energy optimization algorithm. For example, a Graph Cut technique and/or a Random Walker technique. In some embodiments, the optimization unit 540 may optimize the segmentation result based on the tumor morphology.

In some embodiments, the optimization may include a mis-segmentation optimization, a less under-segmentation optimization, or the like, or any combination thereof. The mis-segmentation optimization may optimize a mis-segmentation in the segmentation result. In some embodiments, the mis-segmentation optimization may refer to a morphology processing based on a distance field. The morphology processing may include erosion, an expansion, an opening operation, a closing operation, or the like, or any combination thereof. For example, the optimization unit 540 may determine the distance field of each voxel in the mask of the ROI. The optimization unit 540 may select a suitable erosion number $T_1$ and implement the erosion on the part of the distance field whose erosion number may be smaller than $T_1$. Each voxel may be a voxel in the marked tumor region. In some embodiments, the optimization unit 540 may determine a maximum value of the distance field of the voxels in the ROI, and the erosion number $T_1$ may be ½, ⅓, ¼, ⅕, etc. As another example, the optimization unit 540 may determine the distance field of each voxel in the mask of the ROI or a part (for example, the non-tumor region) of the mask of the ROI, select a suitable expansion value $T_2$, and implement the expansion on a part of the distance field whose expansion value may be greater than $T_2$. The expansion value $T_2$ may be identical to or different from the erosion number $T_1$.

The less under-segmentation optimization may optimize less under-segmentation in the segmentation result. In some embodiments, the under-segmentation optimization may include a region growing, an Otsu's technique, a K-means clustering algorithm, a blur c-means clustering algorithm, or the like, or any combination thereof. In some embodiments, the optimization unit 540 may implement the corresponding under-segmentation optimization based on the tumor morphology. For example, the tumor morphology is a calcified tumor or a lipiodol embolization tumor; the optimization unit 540 may determine a bright region and a dark region in the segmentation result. The image may be segmented based on the voxel values of the bright region and the dark region. The bright region may refer to a region having bigger voxel values in the tumor region. The dark region may refer to a region having smaller voxel values in the tumor region. The voxel value may include a CT value, a grayscale value, brightness, or the like, or any combination thereof. In some embodiments, the optimization unit 540 may determine a bright region and a dark region in the segmentation result using a blur c-means clustering algorithm. In some embodiments, the image segmentation may be based on the region growing. As another example, the tumor morphology may be a dark tumor, and the optimization unit 540 may analyze the coarse segmentation result to implement the image segmentation. In some embodiments, the analysis may include analyzing the voxel value, the number or count of the voxels, and the voxel value distribution of the coarse segmentation result. As yet another example, the optimization unit 540 may analyze a grayscale value of the coarse segmentation result, and determine a grayscale value threshold of the dark tumor, thereby implementing a region growing. As yet another example, the tumor morphology is a bright tumor, the optimization unit 540 may determine a bright region in the bright tumor, and perform the image segmentation based on the voxel value of the bright region. In some embodiments, the optimization unit 540 may determine the bright region in the segmentation result based on the blur c-means clustering algorithm. In some embodiments, the image segmentation may be based on the region growing. For example, the tumor morphology is a heterogeneity tumor, and the optimization unit 540 may optimize or may not optimize the heterogeneity tumor.

It should be noted that the above description of the image processing device 120 may be merely an example, and should not be understood as the only embodiment. To those skilled in the art, after understanding the basic principles of the connection between different units, the units, and connection between the units may be modified or varied without departing from the principles. The modifications and variations may be still within the scope of the current application described above. For example, the coarse segmentation module 330 may include a storage unit. The storage unit may store middle data, an image segmentation result, an optimized segmentation result generated by the coarse segmentation module 330. As another example, the coarse segmentation module 330 may not include the preprocessing unit 520. Such modifications may be in the protective scope of the present application.

Figure 6:
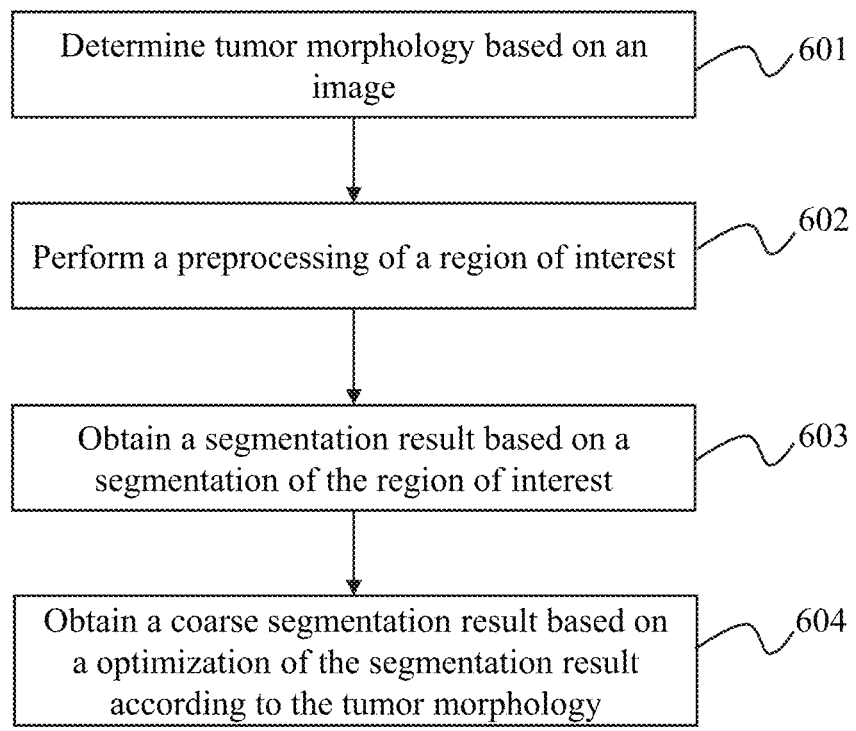
FIG. 6 is a flowchart illustrating an exemplary process for coarse segmentation according to some embodiments of the present disclosure.

FIG. 6 is a flowchart illustrating an exemplary coarse segmentation according to some embodiments of the present disclosure. In some embodiments, at least a portion of the process 600 may be implemented by the coarse segmentation module 330 of the image processing device 120 as illustrated in FIG. 1.

In 601, tumor morphology may be determined based on an image. The image may include image information. The image information may include information related to an ROI, information provided by a user, or the like, or any combination thereof. The tumor morphology may include a calcified tumor, a lipiodol embolization tumor, a dark tumor, a bright tumor, a heterogeneity tumor, a giant tumor, etc. In some embodiments, the determining of the tumor morphology may include a first determination and a second determination. The first determination may include determining the tumor morphology for a first time to obtain first tumor morphology. The second determination may include determining the tumor morphology for a second time to obtain second tumor morphology based on the first determination. More descriptions regarding the determining may be found elsewhere in the present disclosure. See, e.g., FIG. 7 and the relevant descriptions thereof.

In 602, the ROI may be preprocessed. The preprocessing may include a resolution normalization of the ROI, enhancing a contrast ratio of the ROI, a denoising operation, or the like, or any combination thereof. The resolution normalization of the ROI may include determining a resolution of the ROI and setting the resolution of the ROI based on the resolution of the ROI. The enhancing contrast of the ROI may include a histogram equalization, a greyscale transformation technique (for example, a linear greyscale transformation, a non-linear greyscale transformation), an image sharpening enhancement. The denoising operation may include a mean filtering, a median filtering, a multi-image average filtering, a low-pass filtering, a wiener filtering, the least square filtering, etc. In some embodiments, the preprocessing may be implemented by the preprocessing unit 520. More descriptions regarding the preprocessing may be found elsewhere in the present disclosure. See, e.g., FIG. 5 and the relevant descriptions thereof.

In 603, the ROI may be segmented to obtain a segmentation result. The segmentation may include a learning classification technique, a segmentation technique based on a threshold, a segmentation technique based on an edge, a segmentation technique based on a region, a segmentation technique based on a graph theory, a segmentation technique based on an energy functional, a clustering algorithm, or the like, or any combination thereof. The learning classification technique may segment the image based on machine learning. In some embodiments, the learning classification may sort the voxels in the image into first-class voxels (for example, the tumor voxel), second-class voxels (for example, the non-tumor voxel), or the like. In some embodiments, the machine learning may include a supervised learning (for example, linear discriminant analysis, support vector machine, decision tree, naive Bayesian), an unsupervised learning (for example, a Kmeans algorithm, a self organization map network, a gaussian mixture model), a regression analysis, or the like, or any combination thereof. The segmentation technique based on the threshold may include an Otsu's technique, a minimum error technique, a maximum entropy technique, etc. The segmentation technique based on the edge may be performed based on a differential operator (for example, a Robert operator, a Prewitt operator, a Sobel operator, a Laplacian operator, a Canny operator). The segmentation algorithm based on the region may include a region growing, a regional merge and split technique, a watershed segmentation algorithm, etc. The segmentation technique based on the graph theory may include a minimum spanning tree technique, a Normalized Cut technique, a Min-Max Cut technique, a Graph Cut technique, etc. The segmentation technique based on the energy function may be an active contour model and an algorithm based on the active contour model (for example, a Snake model, a level-set algorithm). The clustering algorithm may include a blur c-means clustering algorithm, a K-means clustering algorithm, etc. In some embodiments, the process 600 may segment the ROI by the learning classification technique. In some embodiments, segmenting of the ROI may be completed by the segmentation unit 530. More descriptions regarding the segmenting may be found elsewhere in the present disclosure. See, e.g., FIG. 5, FIG. 8 and the relevant descriptions thereof.

In 604, the segmentation result may be optimized to obtain a coarse segmentation result based on the tumor morphology. In some embodiments, the segmentation result may be a mask of the segmented ROI. In some embodiments, the mask of the ROI may be marked. For example, the process 600 may mark the segmented tumor region or the non-tumor region in the mask of the ROI. In some embodiments, the optimization may include a mis-segmentation optimization, a less under-segmentation optimization, or the like, or any combination thereof. The mis-segmentation optimization may be optimizing the mis-segmentation in the segmentation result. In some embodiments, the mis-segmentation optimization may be morphology processing based on a distance field. The morphology processing may include erosion, an expansion, an opening operation, a closing operation, or the like, or any combination thereof. The under-segmentation optimization may be optimizing the less under-segmentation in the segmentation result. In some embodiments, the less under-segmentation optimization may include a region growing, an Otsu's technique, a K-means clustering algorithm, a blur c-means clustering algorithm, or the like, or any combination thereof. In some embodiments, the process 600 may implement the corresponding less under-segmentation optimization based on the tumor morphology. For example, the tumor morphology may be a calcified tumor a lipiodol embolization tumor, the process 600 may determine a bright region and a dark region in the segmentation result using the blur c-means clustering algorithm, and implement a region growing based on the voxel value of the bright region and the dark region. For example, the tumor morphology may be a dark tumor, and the process 600 may analyze a grayscale value of the coarse segmentation result, and determine a threshold of the grayscale value of the dark tumor, thereby implementing the region growing. For another example, the tumor morphology may be a bright tumor, and the process 600 may determine a bright region in the segmentation result by the blur c-means clustering algorithm, and implement the region growing based on the voxel value of the bright region. As yet another example, the tumor morphology may be a heterogeneity tumor, and the process 600 may not optimize the heterogeneity tumor. In some embodiments, the optimization of the segmentation result based on the tumor morphology may be implemented by the optimization unit 540. More descriptions regarding the optimization may be found elsewhere in the present disclosure. See, e.g., FIG. 5, FIG. 8 and the relevant descriptions thereof.

Figure 7:
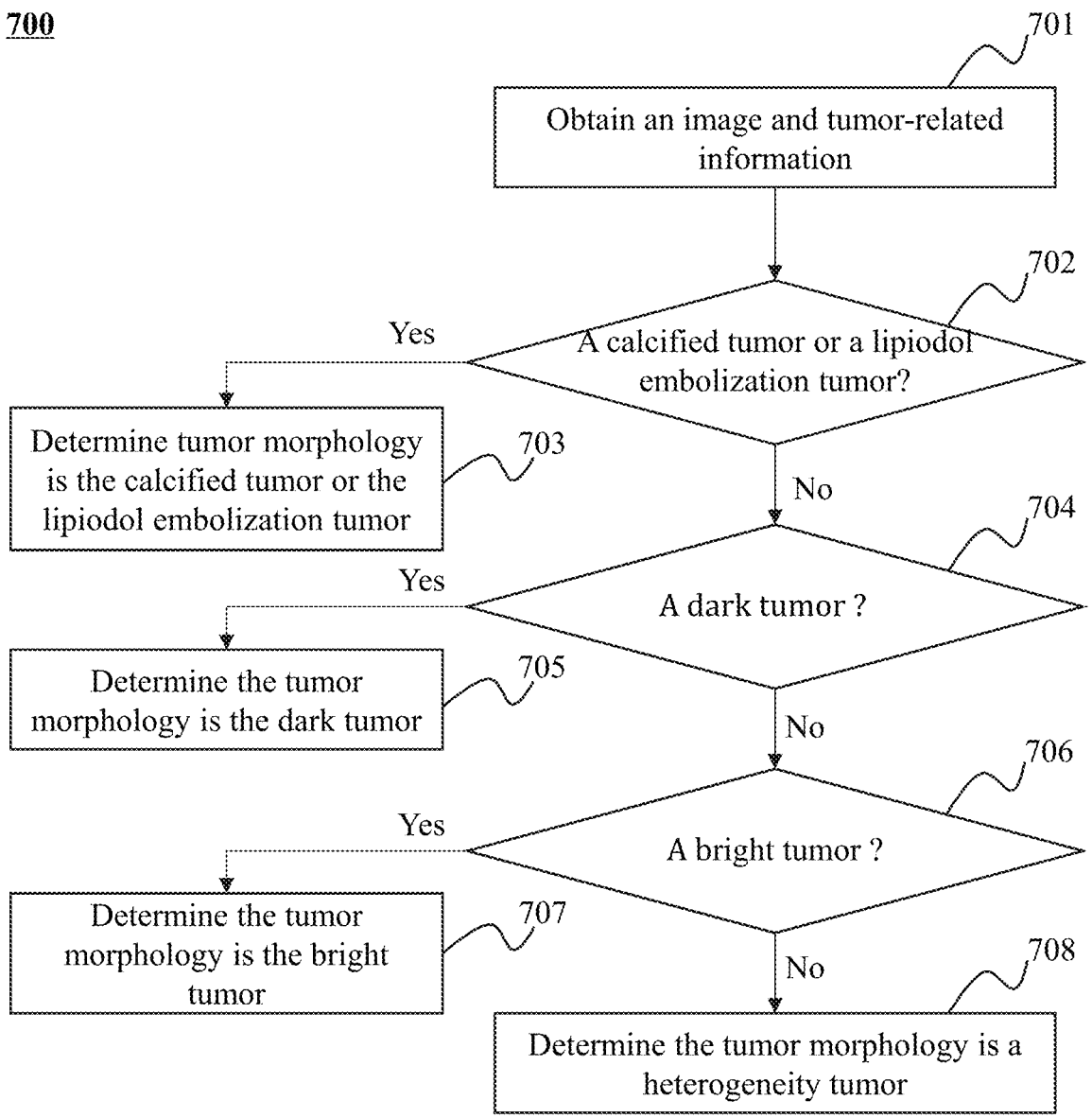
FIG. 7 is a flowchart illustrating an exemplary process for determining a tumor morphology according to some embodiments of the present disclosure.

It should be noted that the above descriptions of the process 600 may be merely provided for the purposes of illustration, and not intended to limit the scope of the present disclosure. For persons having ordinary skill in the art, multiple variations and modifications may be made under the teachings of the present disclosure. However, those variations and modifications may not depart from the scope of the present disclosure. For example, in some embodiments, operation 601 in the process may be implemented after operation 602 in the process 600. As another example, operation 602 may be omitted in the process 600. Such modifications may be in the protective scope of the present application. FIG. 7 is a flowchart illustrating an exemplary process for determining tumor morphology according to some embodiments of the present disclosure. In some embodiments, at least a portion of process 700 may be implemented by the determination unit 510 of the coarse segmentation module 330 of the image processing device 120.

In 701, an image and tumor-related information may be obtained. The image may be a medical image, or image data, etc. In some embodiments, the medical image may be a CT image. In some embodiments, the image may include a tumor region. In some embodiments, the image may be a three-dimensional image composed of a plurality of two-dimensional images. The plurality of two-dimensional images may include tumor regions, respectively. Cross-sectional areas of the tumor regions in different two-dimensional images may be different. In some embodiments, the tumor-related information may be provided by a user. The tumor-related information may be obtained based on information provided by the user. The tumor-related information may be automatically generated by the image processing system 100 (for example, the image processing device 120 of the image processing system 100). In some embodiments, the user may determine a size of the cross-sectional area of the tumor region based on a subjective judgment (for example, observing with the eyes) and/or the related tumor region information (for example, the area, the perimeter of the tumor region area, the number or count of the contained voxels). In some embodiments, the determination unit 510 of the coarse segmentation module 330 may determine the size of the cross-sectional area of the tumor region based on the corresponding tumor region information (for example, an area, a perimeter of the tumor region area, a number of the contained voxels). In some embodiments, the user and/or the determination unit 510 may draw a marked line in the tumor region having a bigger cross-sectional area. In some embodiments, the determination unit 510 may draw a marked line in the tumor region in other two-dimensional images based on the marked information (for example, the marked line of the tumor region in the one or more two-dimensional images) in one or more two-dimensional images. For example, the marked lines drawn by the determination unit 510 of the other two-dimensional images may be the same as those of the one or more two-dimensional images. The marked line may pass through the tumor region. In some embodiments, the marked line may be a straight line. A line segment may be formed by an intersection between the straight line and the tumor region, and a length of the line segment may be marked as $d_1$. In some embodiments, the tumor-related information may be a length, a midpoint, a voxel value of the line segment, the number or count of voxels, or the like. The voxel value may include a CT value, a grayscale value, brightness, or the like, or any combination thereof.

In 702, whether the tumor morphology is a calcified tumor or a lipiodol embolization tumor may be determined. The calcified tumor or the lipiodol embolization tumor may include a bright region and a dark region. The bright region may refer to a region having a bigger voxel value in the tumor region. The dark region may refer to a region having a smaller voxel value in the tumor region. The process 700 may determine whether the tumor region of the image obtained by operation 701 is the calcified tumor or the lipiodol embolization tumor. In some embodiments, the determining in process 700 may be based on the voxel value of the line segment in the tumor-related information. For example, the process 700 may determine the tumor region is the calcified tumor or the lipiodol embolization tumor based on a maximum value and a minimum value of the voxel values of the line segment. In some embodiments, the process 700 may determine the maximum value and the minimum value of the voxel values. When a difference between the maximum value and the minimum value is greater than a first threshold, and the maximum value is greater than a second threshold, the process 700 may implement operation 703. In 703, the calcified tumor or the lipiodol embolization tumor in the tumor morphology may be determined. The voxel value may be a CT value. The first threshold may be a number between 380 to 450, for example, 390, 400, 410, etc. The second threshold may be a number between 180 to 220, for example, 190, 200, 210, etc.

When the process 700 determines that the tumor morphology is not the calcified tumor or the lipiodol embolization tumor, the process 700 may implement operation 704. In 704, it may be determined whether the tumor morphology is a dark tumor. The dark tumor may refer to smaller voxel values of the tumor region. The process 700 may determine whether the tumor region in the image obtained by operation 701 is a dark tumor. In some embodiments, the process 700 may determine whether the tumor region is the dark tumor based on the voxel values of the line segment in the tumor-related information. For example, the process 700 may determine whether the tumor region is the dark tumor based on a voxel value distribution of the line segment. In some embodiments, the process 700 may determine the voxel value distribution of the line segment. When the voxel values of most voxels in the line segment are smaller than a third threshold, operation 705 may be implemented. In 705, the dark tumor of the tumor morphology may be determined. The voxel value may be the CT value. In some embodiments, in the dark tumor, a percentage of the voxels whose voxel values in the line segment are smaller than the third threshold may be 70% to 90%, for example, 75%, 80%, 85%, etc. In some embodiments, in the dark tumor, the percentage of the voxels whose voxel values in the line segment are smaller than the third threshold may be at least 30%, at least 40%, at least 50%, at least 60%, or at least 70%. The third threshold may be a histogram peak value in the ROI.

When operation 704 determines the tumor morphology is not the dark tumor, operation 706 may be implemented. In 706, it may be determined whether the tumor morphology is a bright tumor. The bright tumor may refer to a tumor region in the image the voxel values of whose voxels are greater than voxels of other regions of the image. The process 700 may determine whether the tumor region in the image obtained by operation 701 is a bright tumor. In some embodiments, the process 700 may determine whether the tumor region is the bright tumor based on the voxel values of the line segment in the tumor-related information. For example, the process 700 may determine whether the tumor region is the bright tumor based on the voxel value distribution of the line segment. In some embodiments, the process 700 may determine the voxel value distribution of the line segment. When the voxel values of a part of voxels of the line segment are greater than a fourth threshold, 707 may be implemented. In 707, the tumor morphology is determined as the bright tumor. The voxel value may be the CT value. In some embodiments, in the bright tumor, a percentage of the voxels whose voxel values in the line segment are greater than the fourth threshold may be 30% to 50%, for example, 35%, 40%, 45%, etc. In some embodiments, in the bright tumor, the percentage of the voxels whose voxel values in the line segment are greater than the fourth threshold may be no greater than 80%, no greater than 70%, no greater than 60%, no greater than 50%, or no greater than 40%. The fourth threshold may be the maximum value of the voxel values of voxels in the ROI, for example, a histogram peak value in the ROI.

When the process 700 determines the tumor morphology is not the bright tumor, operation 708 may be implemented. In 708, the tumor morphology may be determined as a heterogeneity tumor.

It should be noted that the above descriptions of the process 700 may be merely provided for the purposes of illustration, and not intended to limit the scope of the present disclosure. For persons having ordinary skill in the art, multiple variations and modifications may be made under the teachings of the present disclosure. However, those variations and modifications may not depart from the scope of the present disclosure. In some embodiments, the process 700 may include other operations. For example, the process 700 may implement the second determination. In some embodiments, the order in the process 700 may be variable. For example, the process 700 may first determine whether the tumor morphology is the bright tumor, and then determine whether the tumor morphology is a dark tumor. Such modifications may be in the protective scope of the present disclosure.

Figure 8:
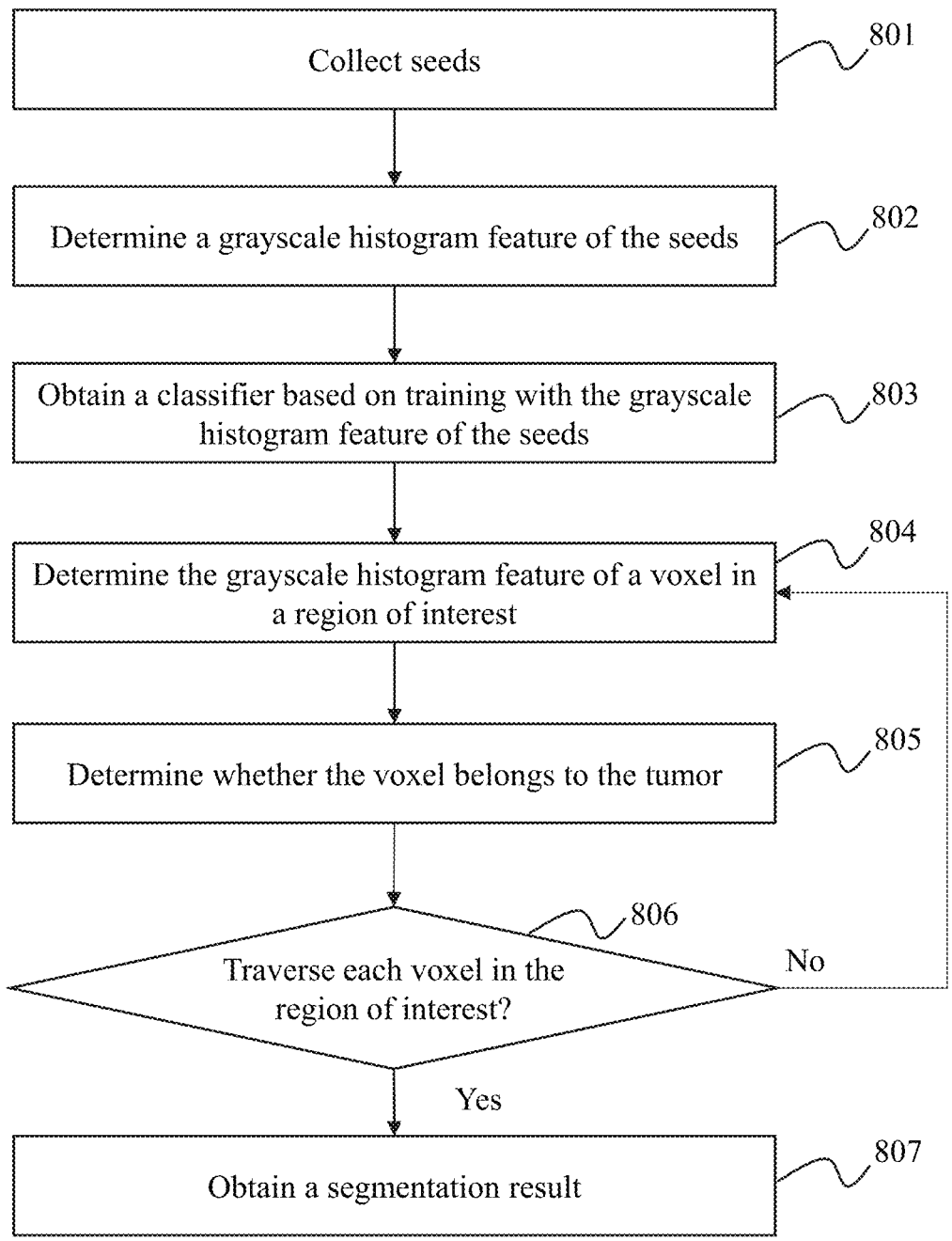
FIG. 8 is a flowchart illustrating an exemplary process for segmenting a region of interest in a coarse segmentation according to some embodiments of the present disclosure.

FIG. 8 is a flowchart illustrating an exemplary process for segmenting an ROI in a coarse segmentation according to some embodiments of the present disclosure. In some embodiments, the process 800 may be implemented by the segmentation unit 530 of the coarse segmentation module 330 of the image processing device 120.

In 801, seeds may be acquired. The seeds may refer to voxels in the ROI. In some embodiments, the seeds may include positive-sample seeds and negative-sample seeds. The positive-sample seeds may be voxels in a tumor region. The negative-sample seeds may be voxels in a non-tumor region. In some embodiments, the tumor region may be a region defined by a square whose center (for example, a midpoint, etc.) is a point in a line segment drawn by a user. A side length of the region may be $d_3$. The point of the line segment drawn by the user may be designated by the user, or may be determined by the image processing device 120 (for example, the segmentation unit 530 of the coarse segmentation module 330 of the image processing device 120). In some embodiments, $d_3 = d_1 * l$, $0 < l < 1$. In some embodiments, the l may be a number of 0.3, 0.5, etc. In some embodiments, the non-tumor region may be a region defined by a square whose center is a point (for example, a midpoint, etc.) in the line segment drawn by the user. A side length may be $d_4$. The none tumor region may refer to a region except the tumor region. In some embodiments, $d_4 = d_1 * t$, $1 < t < r$. In some embodiments, t may be 1.1, 1.2, 1.3, 1.4, 1.5, etc. For example, the tumor region may refer to a region in which the ROI does not overlap a region defined by a square whose center is a point in the line segment drawn by the user and a side length is $d_4$. In some embodiments, the process 800 may acquire 200 to 400 positive-samples seeds (for example, 250, 300, 350). In some embodiments, the process 800 may collect 500 to 700 negative-sample seeds, for example, 500, 600, 700, etc.

In 802, a grayscale histogram feature of the seeds may be determined. The grayscale histogram feature of the seeds may be a greyscale histogram feature in a seed neighborhood. The seed neighborhood refers to a region centered on a seed. In some embodiments, the seed neighborhood may be a cube, a rectangular parallelepiped, a sphere, an irregular polyhedron, etc. In some embodiments, the seed neighborhood may be a sphere whose center is the seed and a side length is j voxels. In some embodiments, j may be a number between five to ten. For example, j may be 6, 7, 8, etc. The greyscale histogram feature may be the greyscale histogram itself. In some embodiments, the process 800 may normalize the grayscale value of the ROI to a fixed value S. In some embodiments, S may be a number between 1 to 256. In some embodiments, the greyscale histogram feature may be a 256-dimensional vector.

In 803, a classifier may be obtained based on training with the grayscale histogram feature of the seeds. The classifier may be configured to recognize and classify an object. In some embodiments, the recognition and classification technique may include a pattern recognition technique, a machine learning technique, etc. The pattern recognition technique may include a linear discriminate technique. The machine learning technique may include a support vector machine technique, Adaboost, a neural network, etc. In some embodiments, the process 800 may train the greyscale histogram feature of the seeds based on the linear discriminant analysis to obtain a linear classifier. In some embodiments, the linear classifier may be defined according to Equation (9) below.

$$C = \begin{cases} 1, & y > T \\ 0, & y \leq T \end{cases}, y = w_1^* v_1 + w_2^* v_2 + \ldots + w_s^* v_s, \qquad (9)$$

Where C represents the linear classifier, v1, v2, . . . , vs represents the greyscale histogram, 1, 2, . . . , s represents greyscale level, w1, w2, . . . , ws represents weighting coefficient, y represents a feature weighted value, and T represents a grayscale level threshold.

In 804, the grayscale histogram feature of the voxels in the ROI may be determined. The grayscale histogram feature of the voxels in the ROI may refer to the greyscale histogram of a voxel neighborhood. The voxel neighborhood may refer to a region centered on the voxel. In some embodiments, the voxel neighborhood may be a cube, a rectangular parallelepiped, a sphere, an irregular polyhedron, etc. In some embodiments, the voxel neighborhood may be a sphere whose center is the voxel and a side length is k voxels. In some embodiments, k may be a number between 5 to 10. For example, k may be 6, 7, 8, etc. In some embodiments, k may be identical to or different from j in 802.

In 805, the classifier may determine whether the voxel belongs to a tumor. In some embodiments, the process 800 may classify the voxels in the ROI based on the classifier obtained in 803. In some embodiments, when a feature weighted value of the voxel is greater than T, the process 800 may determine that the voxel belongs to the tumor region. When the feature weighted value of the voxel is smaller than T, the process 800 may determine that the voxel may not belong to the tumor region.

In 806, whether each voxel in the ROI is traversed may be determined. In some embodiments, the process 800 may determine whether each voxel in the ROI is classified. For example, the process 800 may determine the voxel belongs to the tumor region or the non-tumor region. When not all voxels in the ROI are traversed, operation 804 in the process 800 may be implemented. In 804, the process 800 may continue to obtain the greyscale histogram feature of the voxels in the ROI, and classify thereof based on the classifier. When each voxel in the ROI is traversed, operation 807 in the process 800 may be implemented. In 807, a segmentation result may be obtained. The segmentation result may be a segmented image or segmented image data.

It should be noted that the above descriptions of the process 800 may be merely provided for the purposes of illustration, and not intended to limit the scope of the present disclosure. For persons having ordinary skill in the art, multiple variations and modifications may be made under the teachings of the present disclosure. However, those variations and modifications may not depart from the scope of the present disclosure. In some embodiments, an order may be variable in the process 800. For example, the process 800 may determine the grayscale histogram feature, then obtain the classifier based on training with the seeds. Such modifications may be in the protective scope of the present disclosure.

The above may describe different aspects of methods for image processing and/or methods for implementing other operations by programs. Program portions of the present disclosure may be considered to be "products" or "articles of manufacture" in the form of executable codes and/or related data, which may be embodied or implemented by a computer readable medium. Tangible and permanent storage media may include memory or storage used by any computer, processor, or similar device or related module, e.g., semiconductor storage, tape drive, disk drives, or devices that are able to provide storage functions for software at any time.

All software or a portion thereof may sometimes communicate via the network, such as Internet or other communication networks. The communication may load the software from one computer device or processor to another, e.g., from a management server or host computer of an image processing system to a hardware platform of a computer environment, other computer environments implementing the system, or platforms having similar functions related to providing information required for image processing. Therefore, another medium capable of transmitting software elements or used as a physical connection between local devices, such as lightwave, electric wave, electromagnetic wave, etc., may be propagated through cables, cables, or air. The physical medium used for the carrier, such as cable, wireless connection, or fiber optic cable, or the like, may be considered to be the medium that carries the software. Usage herein unless the tangible "storage" medium is restricted, other terms that refer to a computer or machine "readable medium" may refer to a medium that participates in the execution of any instruction by the processor.

Thus, the form of the computer readable medium may be various, including but not limited to, a tangible storage medium, a carrier medium or a physical transmission medium. Stable storage media may include optical or magnetic disks, or storage systems used in other computers or similar devices that may enable the implementation of the system components described in the figures. Unstable storage media may include dynamic memory, such as the main memory of a computer platform. Tangible transmission media may include coaxial cables, copper cables, and fiber optics, including the circuitry that forms the bus within the computer system. The carrier transmission medium may transmit electrical signals, electromagnetic signals, acoustic signals or optical signals, which may be generated by radiofrequency or infrared data communication. Typical computer readable media may include hard disks, floppy disks, magnetic tapes, any other magnetic media; CD-ROM, DVD, DVD-ROM, any other optical media; punched cards, any other physical storage media containing aperture patterns; RAM, PROM, EPROM, FLASH-EPROM, any other memory slices or tapes; carriers, cables or carriers for transmitting data or instructions, any other program codes and/or data that may be read by a computer. Many of the forms of the computer readable media may appear in the process of the processor executing instructions, passing one or more results.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "module," "unit," "component," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A method for segmenting an image implemented on at least one device each of which has at least one processor and at least one storage device, the method comprising:
   obtaining, by the at least one processor, an image and related information, the image including a tumor region;
   determining, by the at least one processor, a region of interest in the image, the region of interest including the tumor region;
   performing, by the at least one processor, a first segmentation of the region of interest to obtain a first segmentation result, and
   performing, based on the first segmentation result, a third segmentation of the region of interest, wherein the first segmentation includes:
      determining tumor morphology relating to the tumor region;
      performing a second segmentation of the region of interest to obtain a second segmentation result; and
      optimizing, based on the tumor morphology, the second segmentation result to obtain the first segmentation result.

2. The method of claim 1, wherein the third segmentation is based on a level-set algorithm.

3. The method of claim 2, wherein performing the third segmentation based on the level-set algorithm comprises:
   obtaining a distance field function;
   initializing the distance field function based on the first segmentation result; and
   performing at least one iteration of the distance field function.

4. The method of claim 1, the method further comprising:
   obtaining information relating to the region of interest; and
   determining the region of interest in the image based on the information relating to the region of interest.

5. The method of claim 1, wherein:
   the determining of the tumor morphology is based on a straight line passing through the tumor region, a length of a line segment which is an intersection between the straight line and the tumor region being $d_1$.

6. The method of claim 5, wherein the region of interest is a region encompassed by a cube, a center of the cube being a midpoint of the line segment, a length of a side of the cube being $d_2$, wherein $d_2=d_1*r$ and $1<r<2$.

7. The method of claim 5, wherein performing the second segmentation comprises:

collecting a plurality of seeds, the plurality of seeds including at least one positive-sample seed and at least one negative-sample seed;

determining a grayscale histogram feature of the plurality of seeds;

obtaining a classifier based on the grayscale histogram feature of the plurality of seeds; and performing the second segmentation of the region of interest according to the classifier.

8. The method of claim 7, the at least one positive-sample seed is in a first region, wherein the first region is a region encompassed by a cube, a center of the cube being a midpoint of the line segment, a length of a side of the cube being $d_3$, wherein $d_3=d_1*l$ and $0<l<1$.

9. The method of claim 7; the at least one negative-sample seed is in a second region, wherein the second region is a region encompassed by a cube, a center of the cube being a midpoint of the line segment, a length of a side of the cube being $d_4$, where the cube does not coincide with the region of interest, wherein $d_4=d_1*t$ and $1<t<r$.

10. The method of claim 7, wherein obtaining the classifier based on the grayscale histogram feature of the plurality of seeds comprises:

normalizing grayscale values of the region of interest in the image;

obtaining the grayscale histogram feature of a cube region, wherein each of the plurality of seeds is a center of the cube region, a length of a side of the cube region is R;

using the grayscale histogram feature of the cube region for training; and obtaining a classifier based on the training.

11. The method of claim 10, wherein R is a sum of side lengths of j voxels, and j being an integer greater than one.

12. The method of claim 1, wherein performing the first segmentation of the region of interest comprises pre-processing the region of interest.

13. The method of claim 12, wherein pre-processing the region of interest comprises down-sampling of the region of interest, enhancing a contrast ratio of the region of interest, or denoising the region of interest.

14. The method of claim 1, wherein determining the tumor morphology comprises:

determining whether the tumor morphology is a calcified tumor or a lipiodol embolization tumor;

obtaining a first determination result based on that the tumor morphology is not the calcified tumor or the lipiodol embolization tumor;

determining whether the tumor morphology is a dark tumor based on the first determination result;

obtaining a second determination result based on the determination that the tumor morphology is not the dark tumor;

determining whether the tumor morphology is a bright tumor based on the second determination result;

obtaining a third determination result based on the determination that the tumor morphology is not the bright tumor; and determining that the tumor morphology is a heterogeneity tumor based on the third determination result.

15. The method of claim 1, wherein the tumor morphology includes a calcified tumor, a lipiodol embolization tumor, a dark tumor, a bright tumor, or a heterogeneity tumor.

16. The method of claim 15, wherein optimizing, based on the tumor morphology, the second segmentation result comprises:

determining that the tumor morphology is the calcified tumor or the lipiodol embolization tumor;

obtaining a dark region and a bright region based on the determination that the tumor morphology is the calcified tumor or the lipiodol embolization tumor; and performing a regional growing in the dark region and the bright region.

17. The method of claim 15, wherein optimizing, based on the tumor morphology, the second segmentation result comprises:

determining that the tumor morphology is the dark tumor; and performing, based on the determining that the tumor morphology is the dark tumor and the second segmentation result, a growing of the region.

18. The method of claim 15, wherein optimizing, based on the tumor morphology, the second segmentation result comprises:

determining that the tumor morphology is the bright tumor;

obtaining a threshold based on the determination that the tumor morphology is the bright tumor; and performing a regional growing based on the threshold.

19. The method of claim 15, wherein optimizing, based on the tumor morphology, the second segmentation result comprises:

determining that the tumor morphology is the heterogeneity tumor; and based on the determination that the tumor morphology is the heterogeneity tumor, omitting the optimizing the second segmentation result.

20. An image segmentation system implemented on a computing device comprising:

a non-transitory storage device storing executable instructions, and at least one processor, when executing the instructions, configured to cause the system to:

obtain an image and related information, the image including a tumor region;

determine a region of interest in the image, the region of interest including the tumor region; and perform a first segmentation of the region of interest to obtain a first segmentation result, and perform, based on the first segmentation result, a third segmentation of the region of interest, wherein to perform a first segmentation of the region of interest, the at least one processor is configured to cause the system to:

determine tumor morphology relating to the tumor region;

perform a second segmentation of the region of interest to obtain a second segmentation result; and optimize, based on the tumor morphology, the second segmentation result to obtain the first segmentation result.

* * * * *